Feb. 7, 1967   E. H. MAHONEY   3,303,502
HYPERBOLIC CONTINUOUS WAVE POSITION FINDING SYSTEM
INCLUDING AMBIGUITY RESOLUTION
Filed April 22, 1964   3 Sheets-Sheet 1
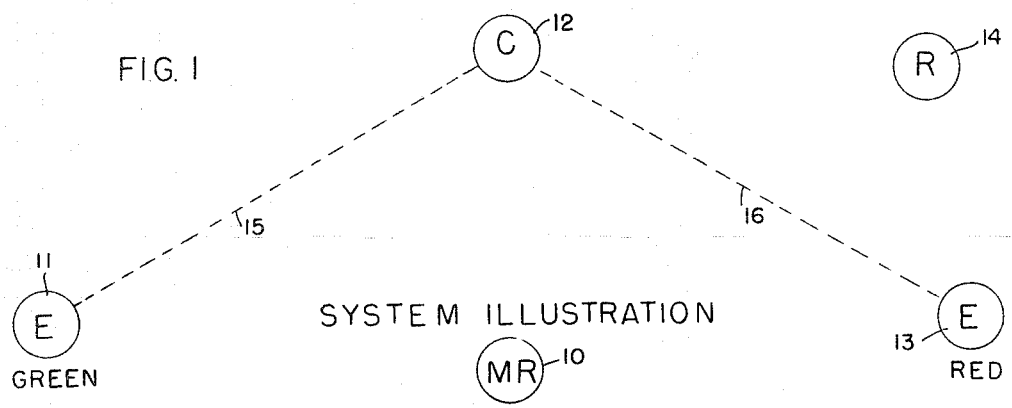
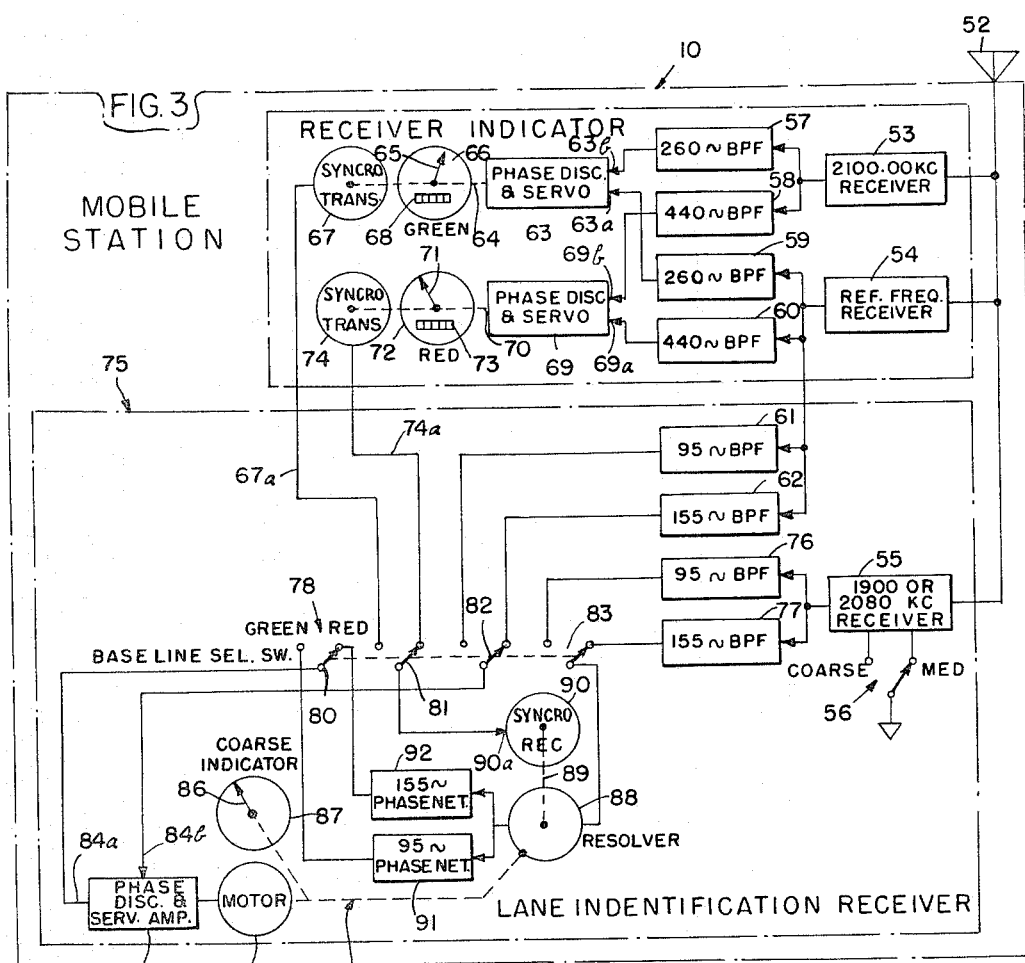
INVENTOR:
EDWARD H. MAHONEY
BY
Mason, Kolehmainen, Rathburn & Wyss
ATT'YS

United States Patent Office 3,303,502
Patented Feb. 7, 1967

3,303,502
HYPERBOLIC CONTINUOUS WAVE POSITION
FINDING SYSTEM INCLUDING AMBIGUITY
RESOLUTION
Edward H. Mahoney, Tulsa, Okla., assignor to Seismograph Service Corporation, Tulsa, Okla., a corporation of Delaware
Filed Apr. 22, 1964, Ser. No. 361,845
28 Claims. (Cl. 343—105)

The present invention relates generally to radio position determining systems and is more particularly concerned with improvements in radio position finding systems of the hyperbolic continuous wave type employing phase comparison in pairs of position indicating signals radiated from a plurality of spaced transmitting points to provide one or more indications from which the position of a mobile receiving point relative to the known locations of the transmitters may be determined very accurately. The invention is particularly concerned with a new and improved system of the above type which is provided with apparatus for retrieving lane identification which may be lost as a result of system failures in the receiving or transmitting equipment or by weak signal areas caused by local conditions adversely affecting radio wave propagation.

In systems of the particular type referred to, the continuous waves radiated from each pair of transmitters bear a phase relationship at the mobile receiving unit which changes as a function of the changing position of the latter unit relative to the transmitting points. More specifically, the waves radiated by each pair of transmitting units of the system are characterized by isophase lines which are hyperbolic in contour about the transmitting points as foci. With this system arrangement, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced transmitters, different pairs of which function to provide a grid-like pattern of intersecting hyperbolic isophase lines in order to obtain a position fix providing an absolute determination of the position of the receiving point.

In Honore Patent No. 2,148,267 a system is disclosed in which the waves radiated from each pair of transmitters are heterodyned at a fixed linked transmitting point and the difference frequency between the heterodyned waves is modulated as a reference signal on the carrier wave output of the link transmitter for radiation to the receiving point where the difference frequency component is detected and phase compared with the difference frequency signal derived by directly heterodyning the transmitted continuous waves arriving at the receiving point from the pair of transmitters. In this manner any phase shifts between the continuous waves radiated from the two transmitters are completely compensated so that the measured phase angle is truly representative of the location at the receiving point between the pair of isophase lines. In Hawkins Patent No. 2,513,316 an improved system is disclosed wherein a single reference transmitter is employed as a link transmitter for radiating all of the reference signals to the mobile receiving point, thereby reducing the number of signal channels required as well as the amount of equipment necessary to provide a complete system.

A particular problem encountered in the operation of continuous wave systems of the type disclosed in the Honore and Hawkins patents is that of eliminating ambiguity from the phase measurements which provide the desired position information. Thus, while the two phase measurements identify the position of the receiving station relative to two intersecting pairs of hyperbolic isophase lines, they do not identify the particular pair of lines to which the indications are related. This means that in operating the system, the geographic location of the receiving point must be known at the start of movement of the receiver relative to the transmitting stations and furthermore that the successive wavelengths or lanes traversed must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

One means employed heretofore for identifying the lanes or grids has been to provide an integrating counter mechanism which adds or subtracts a digit when the phase indicator undergoes a change of 360 degrees. Since a lane is crossed whenever such a 360 degree change occurs, the lanes are continuously identified by the integrating counter while the phase indicator provides information concerning the precise position of the multiple receiver within the lane identified. A system of this type, however, requires continuous uninterrupted operation of the transmitting and receiving facilities since even relatively short periods of interrupted operation may result in the loss of one or more counts on the integrating counters if the mobile receiving unit moves during the period of interruption. Such interruptions might be caused by failure of the indicating, receiving or transmitting equipment for short periods of time or in the alternative, by the presence of a weak signal area in the field pattern of the transmitting system. The presence of a weak signal area, which might be caused by local conditions adversely affecting radio wave propagation, renders the receiver insensitive to phase changes and, hence, the mobile unit may pass through a lane without at the same time adding or subtracting a digit from the counting mechanism. As soon as the signal strength returns to normal or when the system is restored to normal operation the phase indicator again provides accurate information concerning the location of the mobile craft but the integrating counters have, in the meantime, failed to record the lane change and as a result the actual position of the receiver cannot be determined. It would, of course, be desirable to provide a system which operates to provide lane identification signals to permit determination of the proper lane count so that the counters can be reset to the proper positions.

Systems of the type described in the Hawkins Patent No. 2,513,316 are presently in use in the United States and elsewhere to provide position information. It would be desirable to provide these existing systems with apparatus necessary to develop indications for resolving the ambiguities described above while at the same time utilizing a minimum amount of additional equipment both at the transmitting stations and at the mobile receiving units. The satisfaction of this desire, therefore, is an important object of the present invention.

It is also desirable to supplement the existing facilities to provide lane identification signals while at the same time maintaining a compatible system, that is, to permit normal operation of the old type mobile receiving units not equipped to use the lane identification signals without degradation of the quality of the position information. The provision of lane identification facilities to satisfy the latter desire, therefore, constitutes another important object of the present invention.

A further object of the invention is to provide new and improved apparatus for providing lane identification information to facilitate retrieving lost lanes in a hyperbolic continuous wave radio position finding system.

Another object of the present invention is to provide a new and improved transmitting system for use in radio position finding systems of the character described above.

The invention has for another object the provision of a new and improved mobile receiving unit for use in radio position finding systems of the character described.

The invention has for a further object the provision of an improved radio location system of the continuous wave type which is free of phase synchronization difficulties of the character mentioned and in which the aforementioned disadvantages with respect to ambiguity resolution are obviated.

Still another object of the present invention is to provide an improved radio location system of the continuous wave type in which the ambiguity resolution is achieved by obtaining both coarse and medium position indications having sensitivities different from the phase sensitivity normally determined by the frequencies of the radiated waves.

A still further object of the present invention is to provide a radio position finding system of the type described employing new and improved apparatus for providing unambiguous position indications.

Yet another object of the invention is to provide facilities for furnishing lane identification information by obtaining a plurality of low phase sensitivity position indications to provide a rough determination of the position of a mobile craft in order to resolve ambiguities in the position indications having higher phase sensitivities.

The invention has for still another object the provision of a radio position finding system of the character described wherein high phase sensitivity, medium phase sensitivity and low phase sensitivity position indications are obtained, the high phase sensitivity indications being characterized by closely spaced phase coincidences, the medium sensitivity indications being characterized by somewhat more widely spaced phase coincidences in order to resolve ambiguities in the high phase sensitivity position indications and the low phase sensitivity position indications being characterized by widely spaced phase coincidences to resolve ambiguities in the medium phase sensitivity position indications.

The invention, both as to its organization and manner of operation, together with further objects and advantages will best be understood by reference to the following detailed description taken in conjunction with the accompanying drawings, wherein:

FIG. 1 is a schematic diagram showing a typical arrangement of the transmitters employed in a three foci radio position finding system together with a mobile receiving unit whose position is to be determined;

FIG. 3 is a diagrammatic representation of a mobile receiving unit which may be used with the transmitting system shown in FIG. 2 to form a complete radio position finding system of the type illustrated in FIG. 1;

Figure 2:
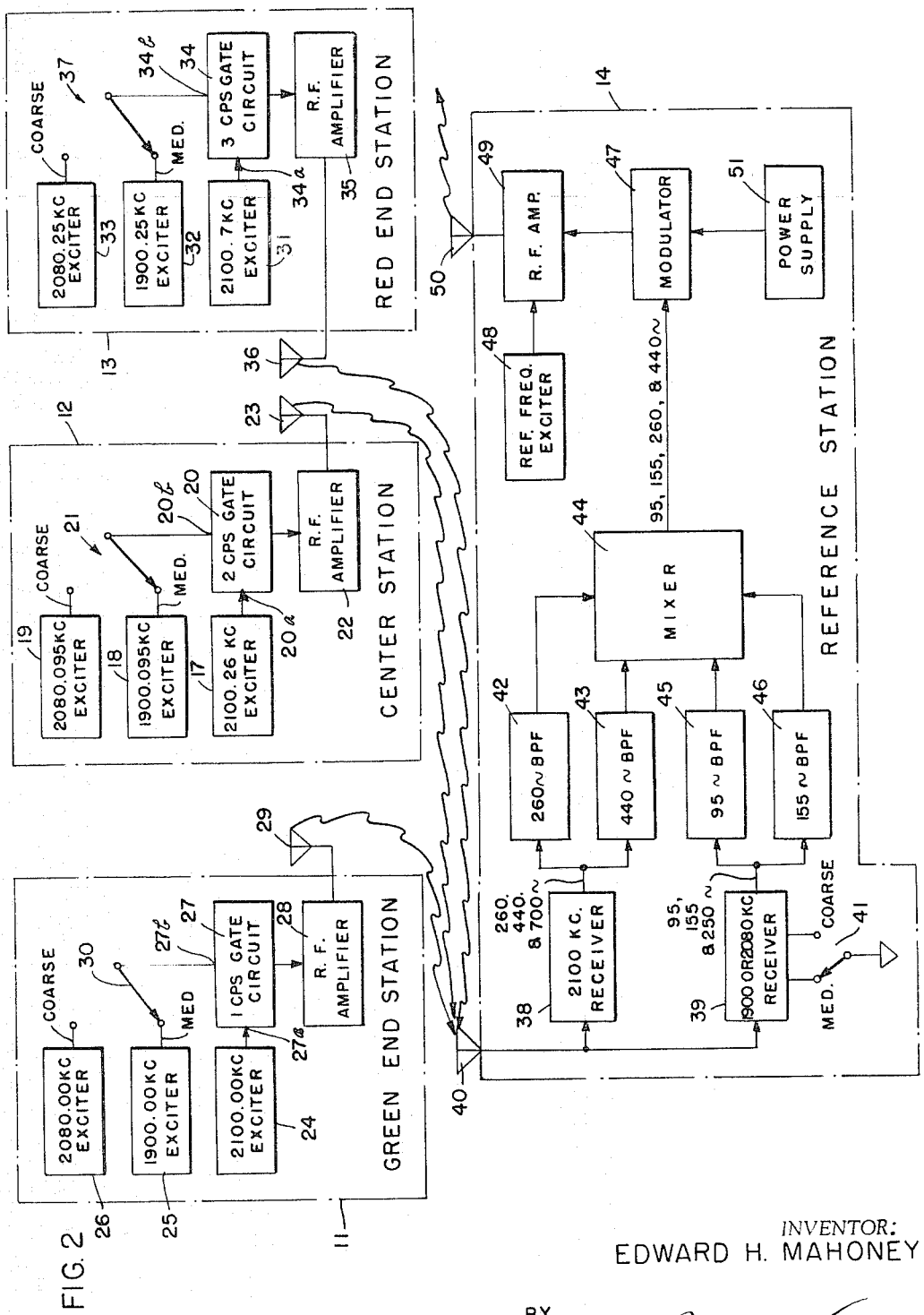
FIG. 2 is a diagrammatic representation of the transmitting portion of the system illustrated in FIG. 1.

Referring now to the drawings and first to FIG. 1 the invention is there illustrated as a three foci hyperbolic, continuous wave system for providing position information at any number of mobile receiving units 10 which may be carried on vessels or vehicles operating within the transmission field of a plurality of spaced apart transmitters or transmitting units 11, 12, 13 and 14. The transmitters 11, 12 and 13 are preferably spaced apart approximately equal distances and are so positioned that an imaginary base line 15 joining the points of location of the units 11 and 12 is angularly related to a similar base line 16 joining the points of location of the units 12 and 13. As a consequence, the transmitter of transmitting unit 12 may be considered to be the center transmitter, while the transmitting units 11 and 13 may be referred to as the end transmitters or stations and the latter units, for convenience, may be respectively designated as the Green end station and the Red end station. The transmitting unit 14 is spaced from all three of the units 11, 12 and 13 and, since its function is to receive the signals radiated from the latter three stations and to develop therefrom reference signals for radiation as modulation components, it is designated as the reference or link transmitting station.

The equipment provided at each of the transmitting stations 11, 12 and 13 is effective to radiate a first position indicating signal which is periodically interrupted for a predetermined period to permit the radiation of either one of two different ambiguity resolution signals. The three position indicating signals radiated from the stations 11, 12 and 13 fall within a first frequency channel while one of the two different ambiguity resolution signals radiated from each of the three stations falls within a second frequency channel and the second ambiguity resolution signals radiated from the three different stations fall within a third frequency channel. The reference station 14 is equipped to receive all of the signals radiated from the transmitting stations 11, 12 and 13 and to heterodyne those signals in pairs in order to develop reference signals for radiation as modulation components upon a space radiated carrier wave. The latter carrier wave lies within a frequency channel, designated as the $F_r$ channel, which is sufficiently distinguishable from the other three frequency channels referred to above to permit selective reception of the four channels by different receiver circuits.

The mobile receiving unit 10 receives all of the position indicating and ambiguity resolution signals as well as the reference station carrier wave with its modulating reference signals. The mobile receiving unit responds to the received signals by providing a first fine position indication representing the location of the mobile craft relative to a first family of hyperbolic isophase lines having foci at the transmitting stations 11 and 12 and by providing a second fine position indication representing the location of the mobile craft relative to a second family of hyperbolic isophase lines having foci at the transmitting stations 12 and 13. The mobile receiver 10 is also equipped to count the lanes of the two families of isophase lines of each fine system traversed by the mobile craft. During the period when the ambiguity resolution signals are being received the mobile receiver is effective to provide other position indications for resolving the ambiguity of the two fine position indications referred to above.

In order to facilitate the description, particular frequencies have been assigned to the various transmitters and receivers of the transmitting and receiving units of the system but it should be understood that the assigned frequencies are merely exemplary and that other frequencies may be chosen, if desired. Briefly considered, the equipment provided at the center transmitting station 12 comprises three different oscillators or exciters 17, 18 and 19 for developing signals having different frequencies. Thus, as is indicated in FIG. 2 the oscillator or exciter 17 develops a first or fine position indicating signal having a frequency of 2100.260 kilocycles while the oscillator or exciter 18 develops a medium ambiguity resolution signal having a frequency of 1900.095 kilocycles and the oscillator or exciter 19 develops a coarse ambiguity resolution signal having a frequency of 2080.095 kilocycles. The output of the exciter 17 is applied directly to a first input 20a of a gate circuit 20 having a second input 20b connected to a manually operated switch 21 which may be selectively operated to apply the output of either of the exciters 18 or 19 to the gate circuit 20. The gate circuit is of the free-running, unsynchronized type and is effective to alternately supply the signals applied to its sets of input terminals 20a and 20b to an RF amplifier 22. The gate circuit may be of any conventional type, for example, a multivibrator controlled electronic switch or a motor driven commutating switch operated at any desired rate. The switching rate should not be very high, however, in order to avoid the creation of frequent switching transient periods during which it is extremely difficult to obtain accurate position indications. Thus, the gate circuit 20 preferably operates at a rate of two cycles per second and, as will become evident as the description proceeds, a two second operating period may be referred to as a complete cycle of operation. During the first and third half seconds of this two second cycle the gate circuit 20 is effective to supply the signals developed by the exciter 17 to the RF amplifier 22 for radiation from a transmitting or emitting antenna 23. During the second and fourth half seconds of the two second cycle the gate circuit 20 supplies the RF amplifier 22 with the signal passed by the switch 21. With the latter switch in the position labeled "Medium" in FIG. 2 the output of the exciter 18 is, of course, supplied to the RF amplifier for radiation from the antenna 23 but, when the switch 21 is thrown to its "Coarse" position, the output of the exciter 19 is applied to the RF amplifier 22. Thus, it will be observed that the center station 12 is effective to radiate a fine position indicating signal developed by the oscillator 17 which is periodically interrupted twice during each cycle to permit the radiation of either one of the two ambiguity resolution signals respectively developed by the oscillators 18 and 19.

The equipment provided at the two end stations 11 and 13 is identical to that provided at the center station but the frequencies developed by the various oscillators differ to some extent and the gate circuits provided at the two end stations operate at different switching rates from the gate circuit provided at the center station. More specifically, the Green end station 11 comprises three oscillators or exciters 24, 25 and 26, a gate circuit 27, an RF amplifier 28 for feeding a radiating antenna 29 and a manually operated switch 30. The oscillator 24 is effective to develop a position indicating signal having a frequency of 2100.00 kilocycles which is applied directly to a first input circuit 27a of the gate circuit 27. The oscillators 25 and 26 develop signals having frequencies of 1900.00 kilocycles and 2080.00 kilocycles, respectively, for application to the fixed contacts of the switch 30. The latter switch is, of course, effective to select the desired ambiguity resolution signal to be applied to the second input circuit 27b of the gate circuit. The latter gate circuit is like the circuit 20 described above but is operated at a different switching rate, for example, at a rate of one cycle per second. Thus, during one half of each two second cycle the gate circuit 27 is effective to supply the RF amplifier 28 with the signal output from the oscillator 24 and, as a result a signal of 2100.00 kilocycles is radiated from the antenna 29 during this one second interval. During a second half of the two second operating cycle the gate circuit 27 is effective to supply the RF amplifier 28 with the ambiguity resolution signal applied to the input circuit 27b by the manually operated selector switch 30. Thus, during the latter one second interval the Green end station is effective to radiate one of the two ambiguity resolution signals developed by the oscillators 25 and 26, the particular frequency being radiated, of course, being determined by the position of the switch 30.

In similar manner, the equipment provided at the Red end station 13 comprises three oscillators or exciters 31, 32 and 33, a gate circuit 34 for controlling the signals applied to an RF amplifier 35 which is, in turn, connected to a radiating antenna 36 and a manually operated, single pole, double throw switch 37. The oscillator 31 is effective to develop a position indicating signal having a frequency of 2100.700 kilocycles which is supplied to a first signal input circuit 34a of the gate circuit 34. The oscillators 32 and 33 are effective to develop ambiguity resolution signals having frequencies of 1900.250 and 2080.250 kilocycles which are respectively applied to the fixed contacts of the switch 37. The latter switch may be manually operated to select the ambiguity signal to be applied to a second signal input circuit 34b of the gate circuit 34. The latter gate circuit is like the gate circuit 20 described above but is operated at a different switching rate, for example, at a rate of three cycles per second, thus providing six one-third second intervals for each two second cycle. During three of the latter intervals, i.e. the first, third and fifth intervals, the gate circuit 34 is effective to supply the signals developed by the oscillator 31 to the RF amplifier 35 for radiation from the antenna 36. During the other three one-third second intervals the gate circuit 34 supplies the RF amplifier 35 with the ambiguity resolution signal applied to the input circuit 34b. The position of the switch 37, of course, determines the ambiguity resolution signal which is applied to the input circuit 34b.

In view of the foregoing description it will be recognized that all three of the gate circuits 20, 27 and 34 are free-running and unsynchronized and, hence, it is impossible to determine which sets of signals will be radiated from the various stations simultaneously. However, since the position indicating signal developed by the oscillator 24 is continuously radiated from the Green end station for a full one second during each cycle, it is apparent that at some time during this one second period the gate circuit 20 will render the center station effective to radiate the position indicating signal developed by the oscillator 17 for a one-half second interval. Thus, the two position indicating signals radiated from the stations 11 and 12 will appear simultaneously for at least a portion of the cycle. The same is also true of the two ambiguity resolution signals respectively radiated by the stations 11 and 12. Moreover, the two fine position indicating signals developed at the stations 12 and 13 will also be radiated simultaneously for at least a portion of the cycle and the same is also true of the two ambiguity resolution signals respectively radiated from these two stations. The use of gate circuits having different switching rates thus permits unsynchronous operation of the various transmitting stations and greatly simplifies the equipment cost and maintenance problems because it avoids the necessity for synchronizing the operation of the various switches. If the gate circuits were switched at exactly the same rate and if the two gates at the stations 11 and 12, for example, were exactly 180° out of phase it is apparent that the position indicating signals developed by the oscillator 24 would never be radiated simultaneously with the position indicating signal developed by the oscillator 17 and, as a result, it would be impossible to obtain any fine or accurate position indications. The same would also be true of the two ambiguity signals radiated from the stations 11 and 12. This condition might also exist between the stations 12 and 13 if the gates 20 and 34 operated at the same switching rate. However, as was indicated above, the use of gate circuits having different switching rates insures that position indications can be obtained even though the gate circuits are not operated synchronously.

The reference or link transmitting station 14 receives the position indicating signal and the ambiguity resolution signal radiated from each of the three stations 11, 12 and 13 and is effective to heterodyne the three position indicating signals in pairs to develop a pair of low frequency reference signals and also to heterodyne the three ambiguity resolution signals in pairs to develop another pair of low frequency reference signals. These four reference signals are then amplitude modulated upon a single carrier wave which is radiated to all of the mobile receiving units 10. To accomplish these results, the reference or link transmitting station 14 comprises a first superheterodyne type receiver 38 having its RF section tuned to accept the three position indicating signals respectively developed by the oscillators 17, 24 and 31 but to reject all of the ambiguity resolution signals radiated from the transmitting stations 11, 12 and 13. A second superheterodyne type receiver 39 has its input connected to a receiving antenna 40 which also supplies input signals to the receiver 38. The second receiver 39 may be rendered selectively operable to accept either the signals in the first ambiguity resolution channel developed by the oscillators 18, 25 and 32 or to accept the signals in the second ambiguity resolution channel developed by the oscillators 19, 26 and 33. A manually operated switch 41 is effective to select the particular channel to be accepted by the receiver 39. In the operation of the system, communication is provided between each mobile receiving unit and the various transmitting sites to permit selection of the desired mode of operation. The communication between the mobile unit and at least one of the transmitting sites is preferably via radio wave transmission but the communication between the four fixed transmitting sites may be either via radio waves or telephone lines. In any event, the switches 21, 30, 37 and 41 are normally left in the "Medium" position shown in FIG. 2 and are all thrown to the "Coarse" position only in response to instructions or request from one of the mobile units which finds itself unable to identify its position from the fine and medium signals.

When the switch 41 is in the position labeled "Medium" in FIG. 2 the local oscillator of the receiver 39 develops a signal of proper frequency to beat with the signals in the first ambiguity resolution channel to produce an IF signal of the frequency to which the IF circuits of the receiver are sharply tuned. Even if the switches 21, 30 and 37 are in the "Coarse" position, the "Coarse" ambiguity resolution signals developed by the oscillators 19, 26 and 33 will not beat with the local oscillator output to produce the required IF signal when the switch 41 is in the "Medium" position. If the switch 41 is thrown to the "Coarse" position with the switches 21, 30 and 37 also in this position, the local oscillator of the receiver 39 is conditioned to produce a signal of proper frequency for mixing with the signals of the second ambiguity resolution channel to develop the desired IF signal.

The receiver 38 is effective to heterodyne the three position indicating signals accepted thereby and to develop at its output terminals the differences therebetween. More specifically, during the positions of the cycle when the 2100.00 kilocycle signal developed by the oscillator 24 arrives at the antenna 40 simultaneously with the 2100.260 kilocycle signal developed by the oscillator 17, the receiver 38 produces the 260 cycle difference therebetween. Similarly, during those positions of the cycle when the 2100.260 kilocycle signal developed by the oscillator 17 arrives at the reference station simultaneously with the 2100.700 kilocycle signal developed by the oscillator 31 the receiver 38 produces the 440 cycle difference. Finally, during those portions of the cycle when the signals developed by the oscillators 24 and 31 arrive at the reference station 14 simultaneously, the receiver 38 produces the 700 cycle difference. The three difference signals are applied to a pair of band pass filters 42 and 43 of conventional construction. The band pass filter 42 is tuned to pass the 260 cycle difference signal but to reject both the 440 and 700 cycle difference frequencies. In similar manner, the band pass filter 43 passes the 440 cycle difference signal but rejects both the 260 and 700 cycle signals. Thus, the 700 cycle signal is rejected by both of the filters 42 and 43 and has no effect upon the operation of the reference station. The two signals passed by the filters 42 and 43 are applied to a linear mixer circuit 44.

With the switch 41 in the "Medium" position shown in FIG. 2 and with the switches 21, 30 and 37 also in their "Medium" position, the receiver 39 is effective to receive the three ambiguity resolution signals respectively developed by the oscillators 18, 25 and 32 and to heterodyne these signals in pairs to develop the difference frequencies therebetween. More specifically, during the portions of the cycle when the 1900.00 kilocycle signal developed by the oscillator 25 arrives at the antenna 40 simultaneously with the 1900.095 kilocycle signal developed by the oscillator 18 the receiver 39 heterodynes these two signals to produce the 95 cycle difference frequency therebetween. Similarly, during those portions of the cycle when the 1900.095 kilocycle signal developed by the oscillator 18 arrives at the reference station 14 simultaneously with the 1900.250 kilocycle signal developed by the oscillator 32, the receiver 39 develops the 155 cycle difference therebetween. During those portions of the cycle when the signals developed by the oscillators 25 and 32 arrive at the reference station together the receiver 39 develops the 250 cycle difference frequency therebetween. All three of the developed difference frequency signals are applied to a pair of band pass filters 45 and 46 connected across the output of the receiver 39. The band pass filter 45 is tuned to pass the 95 cycle difference frequency but to reject both the 155 cycle and 250 cycle signals. The band pass filter 46 passes the 155 cycle difference signal but rejects both the 95 and 250 cycle signals. Thus, both of the band pass filters 45 and 46 reject the 250 cycle signal so that the latter signal has no effect upon the operation of the reference station. The two signals respectively passed by the filters 45 and 46 are applied to the linear mixer circuit 44 where they are linearly combined with the two signals passed by the filters 42 and 43 without mixing or developing sum and difference frequencies.

If the switches 21, 30, 37 and 41 are all in the "Coarse" position, the receiver 39 will heterodyne the signals generated by the oscillators 19 and 26 during each portion of the cycle when those signals are simultaneously received, it will heterodyne the signals developed by the oscillators 19 and 33 whenever the latter signals arrive together and it will heterodyne the signals developed by the oscillators 26 and 33 whenever those two signals are received simultaneously. The described heterodyning action results in the production of a 95 cycle difference frequency when the signals developed by the oscillators 19 and 26 are heterodyned, a 155 cycle difference frequency when the signals developed by the oscillators 19 and 33 are heterodyned and a 250 cycle difference frequency when the signals developed by the oscillators 26 and 33 are heterodyned. The 95 cycle signal is, of course, identical in frequency to the signal produced by heterodyning the medium ambiguity resolution signals from the stations 11 and 12 when the switches are in their "medium" positions although not necessarily of the same phase. Moreover, the 155 cycle signal is identical in frequency to the signal produced by heterodyning the medium ambiguity resolution signals received from the stations 12 and 13 when the switches are in their "Medium" positions. The three reference signals developed by receiver 39 with the switches in their "Coarse" position are supplied to the band pass filters 45 and 46 which reject the 250 cycle signal and separate the 95 cycle and 155 cycle signals before applying them to the linear mixer circuit 44.

Regardless of the position of the switches 21, 30, 37 and 41, the four reference signals passed to the mixer 44 are applied to a conventional amplitude modulator circuit 47 which functions in well known manner to amplitude modulate all of these four reference signals upon the carrier wave output of a reference frequency oscillator or exciter 48. No frequency has been assigned to the latter oscillator since the signals developed can be of any desired frequency as long as it falls within a different channel from the position indicating signal channel and from the two ambiguity resolution channels. The signals developed by the oscillator 48 and the modulation components are amplified by a conventional radio frequency amplifier 49 which has its output circuit connected to a radiating or emitting antenna 50. A power supply 51 supplies operating potential for the various electronic circuits of the reference station although this power supply is illustrated for simplcity as being connected only to the modulator circuit 47.

Existing systems of the type described in the above-identified Hawkins Patent No. 2,513,316 employ all of the transmitting equipment shown in FIG. 2 with the following exceptions:

(a) The exciters 18 and 19, the switch 21 and the gate circuit 20 at the center station 12.

(b) The exciters 25 and 26, the switch 30 and the gate circuit 27 at the Green end station 11.

(c) The exciters 32 and 33, the switch 37 and the gate circuit 34 at the Red end station 13.

(d) The receiver 39, switch 41 and the filters 45 and 46 at the reference station 14.

These existing systems are capable of transmitting signals for providing two fine position indications to identify hyperbolic isophase lines intersecting at the position of the mobile craft. However, they are not capable of radiating signals for providing other, more coarse position indications to resolve ambiguities of the fine position identifications. To modify the existing equipment to permit the radiation of ambiguity resolution signals as described above, it is necessary only to add the components listed above. At each station the components to be added may be formed as a separate unit to be plugged into or wired to the existing equipment.

As is shown in FIG. 3 of the drawings, the equipment provided at the mobile receiving unit 10 comprises a receiving antenna 52 connected to supply input signals for three superheterodyne receivers 53, 54 and 55. The receiver 53 is like the receiver 38 at the reference station 14 and is tuned to accept the three position indicating signals respectively developed by the oscillators 17, 24 and 31 and to reject the carrier wave $F_r$ radiated from the station 14 and both of the ambiguity resolution signals radiated from each of the stations 11, 12 and 13. The receiver 54 is tuned to accept the carrier wave $F_r$ radiated by the station 14 but to reject all of the signals radiated by the stations 11, 12 and 13. The receiver 55 is like the receiver 39 at the reference station 14 and may be rendered selectively operable through operation of a manually controlled switch 56 to receive either the signals of the first ambiguity resolution channel developed by the oscillators 18, 25 and 32 or the signals of the second ambiguity resolution channel developed by the oscillators 19, 26 and 33. As was indicated previously, with the switch in its "medium" position as shown in FIG. 3, the receiver 55 is adapted to receive the signals of the medium or first ambiguity resolution channel, since the local oscillator receiver is effective to beat with the incoming signals of the first ambiguity resolution channel to develop IF signals of the proper frequency. When the switch 56 is thrown to its "Coarse" position the receiver 55 is effective to receive the signals of the second ambiguity resolution channel in a manner which will be evident in view of the foregoing description. The receiver 53 heterodynes in pairs the three position indicating signals respectively received from the stations 11, 12 and 13 to develop difference frequencies of 260, 440 and 700 cycles. These three signals are applied to a pair of band pass filters 57 and 58 which are respectively tuned to pass the 260 cycle and 400 cycle difference frequencies. Both of the filters 57 and 58 reject the 700 cycle signal so that this signal has no effect on the operation of the mobile receiving unit. The reference receiver 54 is effective to detect the modulation components of the signal radiated by the reference station and develops all four of the reference signals of 95, 155, 260 and 440 cycles. The output of the receiver 54 is connected to a set of four band pass filters 59, 60, 61 and 62 which serve to separate the four reference signals and to apply them to indicating equipment at the mobile unit. The two 260 cycle signals respectively passed by the filters 57 and 59 are applied to the signal input terminals of a phase discriminator, amplifier and servo-motor circuit 63.

The phase discriminator, servo-amplifier and servo-motor circuit 63 is generally similar to the arrangement described and claimed in United States Patent No. 2,551,211 granted to James E. Hawkins and Beverly W. Koepel and assigned to the same assignee as the present invention. Reference to the latter patent may be taken for a more detailed description for the operation of the individual components of the indicating equipment at the mobile receiving unit 10. The output shaft of the servo-motor in the circuit 63 is represented by a broken line 64 and drives a rotatable pointer 65 forming part of a phase indicator 66. The output shaft of the servo-motor also drives the rotor of a synchro transmitter 67 of conventional construction which has its stator windings connected to supply an electrical signal representing the position of the rotor. The pointer 65 rotates over a circular face or plate having suitable graduations around its periphery to permit indication of the phase relationship between the two signals applied to the input terminals of the phase discriminator and servo-circuit 63. The latter circuit operates in the manner described in the above-identified Patent No. 2,551,211 to compare the two 260 cycle signals respectively supplied to its input circuits 63a and 63b and to develop a D.C. control signal whenever the compared signals differ in phase. The polarity of the D.C. control signal depends upon the direction of the deviation while the amplitude of the signal, of course, depends upon the amount of the phase difference. This D.C. signal is used to control the direction and amount of drive of the servo-motor and, hence, the reading provided by the indicator 66 is a measure of the phase relationship between the two input signals to the circuit 63.

As will be understood by those skilled in this art, the reading provided by the indicator 66 is also a measure of the position of the mobile receiving unit 10 along one of the hyperbolic isophase lines of a Green family of such lines having foci at the stations 11 and 12 and effectively produced by the radiation of the position indicating signals developed by the oscillators 17 and 24. The indicating scale on the face of the indicator 66 provides a continuous reading from zero degrees to three hundred sixty degrees and, hence, one complete revolution of the pointer 65 during movement of the mobile craft carrying the receiving unit 10 indicates that a lane of the Green hyperbolic family has been traversed. The lanes of the Green family to which the indications on the indicator 66 pertain are spaced apart along the base line 15 by a distance equal to one-half wavelength of the frequency of the position indicating channel and, since these lanes diverge on both sides of the base line, a greater distance must be traversed in other areas to cause a complete revolution of the pointer 65. The latter pointer may be connected through mechanism not shown in the drawings to drive a set of integrating counters 68 which register the number of complete 360° revolutions of the pointer 65, thereby to identify the Green lane within which the mobile receiving unit 10 is located.

The 440 cycle reference signal reproduced by the receiver 54 and passed through the band pass filter 60 is applied to a first input circuit 69a of a phase discriminator, amplifier and servo-motor circuit 69 where this 440 cycle signal is phase compared with the 440 cycle signal developed by the receiver 53 as a result of heterodyning the two position indicating signals of 2100.260 and 2100.700 kilocycles respectively received from the stations 12 and 13. The latter 440 cycle beat signal is passed through the filter 58 and is applied to a second input 69b of the circuit 69. The latter circuit is similar in construction to the phase discriminator, amplifier and servo-motor circuit 63 described above and, as a result, its phase discriminator portion is effective to produce a D.C. control signal whenever the two signals applied to the two input circuits 69a and 69b are not in phase. The latter D.C. signal is amplified and is then used to drive the servo-motor of the circuit 69 so that the output shaft, represented by the broken line 70, occupies a position determined by the phase relationship between the two signals respectively applied to the input circuits 69a and 69b. The servo-motor shaft 70 is connected to drive a pointer 71 of a phase indicator 72 which is identical in construction to the indicator 66 referred to above. As will be apparent from the foregoing description the pointer 71 cooperates with a circular graduated scale or dial to identify the position of the mobile craft along one of the hyperbolic isophase lines of a Red family having foci at the stations 12 and 13 in order ot provide a fine or accurate indication representing the position of the mobile craft relative to these two stations. The pointer 71 may drive a set of integrating counters 73 for counting the number of complete revolutions of the pointer 71, thereby to identify the number of lanes of the Red family of hyperbolic lines traversed and hence, to indicate the lane of the Red family within which the mobile craft is located.

In operation the mobile receiving unit 10 may enter the field of radiation of the transmitting units 11, 12, 13 and 14 at a known geographic location and at this time, the indicators 66 and 72 and their associated counters 68 and 73 may be initially set until their readings correspond to this known geographic location. The pointers 65 and 71 of the indicators are then driven in response to the received signals as the mobile craft is moved from the known geographic location. The output shaft 70 of the servo-motor in the circuit 69 is also connected to drive a rotor of a conventional synchro transmitter 74 which is like the synchro transmitter 67 referred to above and which functions to produce on its output or stator windings an electrical signal representing the position of the pointer 71 or, more specifically, the phase relationship between the two signals applied to the input circuits 69a and 69b.

As thus far described, the indicating equipment is similar to that disclosed in the above-identified Hawkins Patent No. 2,513,316 and, hence, as long as the system remains in continuous operation following the start of the mobile receiving unit at the known geographic location, the pointers 65 and 71 and the counters 68 and 73 function continuously to provide position information identifying a set of intersecting hyperbolic lines forming a position fix at the location of the mobile craft. In the event of equipment failure, either at the transmitting stations or the receiving equipment at the mobile unit, the signal drive to either or both of the phase comparison circuits 63 or 69 may be interrupted and, as a consequence, the pointers and the integrating counters of the non-excited circuit or circuits will remain in the positions occupied just prior to the interruption. Thus, considering the operation of the Green comparison circuit 63 it will be observed that the indications of the pointer 65 and the counter 78 will be maintained despite movement of the mobile craft within the radiation field of the transmitters 11 and 12 during the interruption period and, hence, when the source of trouble has been located and repaired and when the system is restored to normal operation, the indications provided by the Green indicating system will no longer be accurate. More specifically, when the system operation is restored, the 260 cycle reference signal passed by the filter 59 and the 260 cycle heterodyne signal passed by the filter 57 will immediately excite the phase discriminator, amplifier and servo-motor circuit 63 to drive the output shaft 64 until the servo loop in the circuit 63 is balanced whereupon the pointer 65 provides an accurate indication of the hyperbolic isophase line of the Green family along which the mobile receiver unit is located. However, if the mobile receiving unit has traversed one or more full lanes of the Green family during the period of interruption the revolution counter 68 has failed to register the lane change so that it no longer provides an accurate lane count. This same condition may exist in the Red indicating equipment including the circuit 69 and the indicator 72.

In accordance with the present invention, however, lane identification facilities generally indicated by the reference numeral 75 are employed to provide additional position indications to permit identification of the approximate position of the mobile receiving unit 10 so that ambiguities in the fine position indications may be resolved and also to permit the mobile craft to enter the radiation field at other than a known location. The additional equipment making up the lane identification facilities has been enclosed within a broken line box 75 in FIG. 3 and includes the receiver 55, the switch 56 and the two filters 61 and 62 referred to above. The equipment at the unit 10 other than that in the box 75 is present in existing units described in Patent No. 2,513,316 and, hence, any of these units may without alteration be used to provide a pair of fine position indications although obviously they will not provide other indications for resolving ambiguities in the fine systems other than through the indications on the counters 68 and 73. In accordance with the present invention such ambiguity resolution can be obtained by adding the lane identification facilities 75 which may be formed as a separate sub-circuit for plugging into or wiring to the existing mobile receiving equipment. In the operation of these facilities, the output of the receiver 55 is connected to a pair of band pass filters 76 and 77 which are respectively similar to the band pass filters 45 and 46 employed at the reference station 14 and described above. With the switches 21, 30, 37, 41 and 56 in the "Medium" position shown in FIGS. 2 and 3, it is apparent that, during those intervals when the stations 11 and 12 are simultaneously effective to radiate the signals developed by the exciters 18 and 25 the carrier wave radiated from the station 14 will be modulated by a 95 cycle reference signal developed by the receiver 39 and passed through the filter 45. This 95 cycle reference signal is detected by the receiver 54 at the mobile unit and is passed through the filter 61. At the same time, the receiver 55 is effective to heterodyne the two signals developed by the oscillators 18 and 25 during those portions of the cycle when these two signals arrive simultaneously at the antenna 52 so that the receiver 55 is effective to develop a 95 cycle beat or difference frequency signal which is passed through the filter 76 but is, of course, rejected by the filter 77. During those portions of the cycle when the stations 12 and 13 are effective to radiate simultaneously the two signals respecitvely developed by the oscillators 18 and 32 the reference station 14 is effective to modulate the carrier wave developed by the oscillator 48 with a 155 cycle beat frequency signal developed by the receiver 39 and passed through the filter 46. During these portions of the cycle the receiver 54 at the mobile receiving unit 10 is effective to reproduce the 155 cycle reference signal which is passed through the filter 62. During these same portions of the cycle the medium ambiguity resolution signals respectively developed by the oscillators 18 and 32 and radiated from the stations 12 and 13 will arrive at the antenna 52 and will be heterodyned by the receiver 55 to develop the 155 cycle beat or difference frequency therebetween. The latter beat signal is passed through the filter 77 but is, of course, rejected by the filter 76.

When the switches 21, 30, 37 and 41 and 56 are in the "Coarse" positions the reference station 14 is effective to modulate the carrier wave developed by the oscillator 48 with a 95 cycle reference signal during those portions of the cycle when the stations 11 and 12 are effective to radiate simultaneously the two coarse ambiguity resolution signals respectively developed by the oscillators 19 and 26. The receiver 54 at the mobile receiving unit 10 reproduces the 95 cycle reference signal and passes it through the band pass filter 61. During these same portions of the cycle the two signals developed by the oscillators 19 and 26 and arriving simultaneously at the receiving antenna 52 are heterodyned by the receiver 55 to produce the 95 cycle beat or difference frequency therebetween which signal is passed through the filter 76. During those portions of the cycle when the stations 12 and 13 are effective to radiate simultaneously the two coarse ambiguity resolution signals developed respectively by the oscillators 19 and 33, the reference station is effective to modulate the carrier wave developed by the oscillator 48 with a 155 cycle reference signal produced by the receiver 39 and passed through the filter 46. During these same portions of the cycle the reference receiver 54 at the mobile unit is effective to reproduce the 155 cycle reference signal for passage through the band pass filter 62. At the same time, the two coarse ambiguity resolution signals radiated from the stations 12 and 13 arrive simultaneously at the antenna 52 and are heterodyned by the receiver 55 to develop a 155 cycle beat or difference frequency signal which is passed through the filter 77.

In either position of the switch 56, the signals developed by the filters 61, 62, 76 and 77 and the two signals developed by the stator windings of the synchro transmitters 67 and 74 are passed through a base selector switch 78 to a coarse or ambiguity resolution indicating system identified generally by the reference numeral 79. The switch 78 has four switch sections 80, 81, 82 and 83 having movable poles or arms ganged together for joint operation. With the base line selector switch 78 in the "Red" position shown in FIG. 3, the indicating equipment 79 is effective to provide an ambiguity resolution position indication representative of the location of the mobile craft relative to hyperbolic isophase lines having foci at the stations 12 and 13 in order to provide an approximate position indication for identifying the particular isophase line of the fine Red family along which the mobile craft is located. If the switches 21, 37, 41 and 56 are in the "Medium" position, the position indication provided by the equipment 79 will be a medium phase sensitivity indication since it will relate to hyperbolic isophase lines having medium spacing therebetween or, more particularly, a spacing approximately ten times greater than the spacing between the hyperbolic isophase lines of the fine Red family. If the switches 21, 37, 41 and 56 are placed in the "Coarse" position, the indicating system 79 provides a low phase sensitivity or coarse position indication representative of the location of the mobile craft relative to widely spaced hyperbolic isophase lines having foci at the stations 12 and 13 or, more specifically, having phase coincidences approximately ten times more widely spaced than the phase coincidences of the medium position indications. These coarse position indications are effective to identify the particular lane of the medium "Red" system within which the mobile craft is located, while the medium phase sensitivity position indications are effective to identify the particular lane of the fine Red system within which the mobile receiver unit 10 is positioned.

When the four sections of the base line selector switch 78 are thrown to the "Green" position, the indicating equipment 79 is effective to provide medium or coarse position indications relative to hyperbolic isophase lines having foci at the stations 11 and 12. More specifically, with the switches 21, 30, 41 and 56 in the "Medium" position, the indicating equipment 79 provides a medium phase sensitivity position indication to identify the location of the mobile craft relative to hyperbolic isophase lines having foci at the stations 11 and 12 and characterized by phase coincidences approximately ten times wider than the phase coincidences of the fine Green family of hyperbolic isophase lines. Similarly, when the switches 21, 30, 41 and 56 are in the "Coarse" position the indicating equipment 79 is effective to provide coarse position indications of low phase sensitivity to identify the location of the mobile receiver unit relative to hyperbolic isophase lines having foci at the stations 11 and 12 but characterized by phase coincidences approximately ten times more widely spaced than the phase coincidences of the medium system. Here again, the coarse position indications are effective to identify the particular lane of the medium phase sensitivity Green system within which the mobile receiver 10 is located while the medium phase sensitivity position indications are effective to identify the lane of the fine Green system within which the mobile craft is operating.

To accomplish these results, the indicating equipment 79 comprises a phase discriminator and servo-amplifier circuit 84 and a servo-motor 85 which, taken together, are similar to each of the circuits 63 and 69 described above. The phase discriminator and servo-amplifier 84 has a first signal input circuit 84a which receives input signals from section 80 of the base line selector switch 78 and a second input circuit 84b which receives input signals from section 82 of the base selector switch 78. The phase discriminator portion of the circuit 84 compares the two phases of the two signals applied to the input circuits 84a and 84b and provides a D.C. control signal whenever these two applied signals are out of phase. This D.C. control signal is passed through the servo-amplifier portion of the circuit 84 and drives the servo-motor 85 which has its output shaft, as indicated by the broken lines, connected to drive a pointer 86 of a phase indicator or meter 87 to provide an indication of the phase relationship between the two signals applied to the input terminals of the circuit 84 in a manner which will be obvious in view of the foregoing description. The output shaft of the motor 85 is also connected to drive the casing of a control transformer or resolver 88 of the type described in the above-identified patent No. 2,551,211, thus changing the phase of the output signals from the resolver. This resolver includes a rotor winding and a pair of stator windings which are displaced mechanically 90° apart and are respectively connected to a pair of phase networks 91 and 92. The rotor of the resolver 88 is connected, as indicated by the broken line 89, to the rotor of a synchro receiver 90 which has its stator winding 90a supplied with signals from section 81 of the base line selector switch 78. The rotor winding of the resolver or control transformer 88 is excited with signals derived from section 83 of the base line selector switch. The output from the control transformer or resolver 88 is taken from the stator windings and is applied to the phase networks 91 and 92. The network 91 supplies audio frequency signals of 95 cycles to a fixed contact of section 80 of the base line selector switch 78 while the network 92 supplies low frequency signals of 155 cycles to a second fixed contact of that switch section.

Assuming first that the switch 78 is in the position shown in FIG. 3 and that the switches 21, 30, 37, 41 and 56 are in the "Medium" positions it is apparent that the 95 cycle reference signal reproduced by the receiver 54 and the 95 cycle beat signal developed by the receiver 55 have no effect upon the operation of the coarse position indicating facilities 75. However, the 155 cycle reference signal developed by the receiver 54 and passed through the filter 62 is applied through the switch section 82 to the input circuit 84b of the phase discriminator and servo-amplifier 84. At the same time, the 155 cycle beat signal developed by the receiver 55 and passed through the filter 77 is applied through the switch section 83 to the rotor winding of the resolver or control transformer 88. The stator windings of the control transformer 88 thus have induced therein a 155 cycle signal which is passed through the network 92 and through the switch section 80 to the input circuit 84a of the phase discriminator and servo-amplifier 84. The circuit 84 thus has applied to its opposed inputs 84a and 84b a pair of 155 cycle signals which are effective to provide a drive signal for the motor 85 whenever they are not in phase. The pointer 86 functions in the manner described above to indicate the phase relationship between these two applied 155 cycle signals. It it were not for the action of the control transformer or resolver 88 the indicator 87 would provide an indication of the position of the mobile craft relative to hyperbolic isophase lines having foci at the stations 12 and 13 and spaced apart along the base line 16 by one-half wavelength of the 1900 kilocycle medium ambiguity resolution channel. However, the rotor of the resolver 88 is driven by the synchro receiver 90 which receives its excitation signals from the synchro transmitter 74 after passage through the conductor 74a and through section 81 of the base selector switch. The rotor of the synchro receiver 90 is driven at a rate equal to the rate of rotation of the pointer 71 as the mobile craft is moved to traverse the hyperbolic isophase lines of the fine Red family. As will be understood by those skilled in this art, the phase of the signal output from the receiver 88 changes at a rate determined not by the frequency of the signals of the 1900 kilocycle ambiguity resolution channel alone, but at a rate determined by the difference between the 2100 kilocycle fine position indicating signal channel and the 1900 kilocycle medium ambiguity resolution channel or, more specifically, at a rate corresponding to the difference of 200 kilocycles. Thus, the signal output of the resolver 88 changes in phase at a rate of about one-tenth the rate of change in the phase of the fine position indicating signal passed through the filter 58. As a result, the pointer 86 is driven at a rate approximately one-tenth the rate of drive of the pointer 71 and it makes one complete revolution as the pointer 71 makes approximately ten and one-half complete revolutions. The indicator 87 thus provides a medium phase sensitivity position indication representing the position of the mobile craft 10 relative to hyperbolic isophase lines having foci at the units 12 and 13 and spaced apart along the base line 16 by a distance equal to one-half wavelength of the phantom frequency of 200 kilocycles. This position indication has a range of accuracy sufficient to determine the particular lane of the fine Red system. Thus, if the operator at the mobile unit 10 desires to determine his approximate position or if he desires to check the lane count on the counter 73 he merely transfers the reading of the indicator 87 to a chart or nomograph of the area being surveyed. He may then check this information to make certain that it agrees with the lane count on the counter 73. If the reading of the indicator 87 does not correspond with the indication on the counter 73, the latter counters may be reset. If the operator at the mobile unit desires to obtain a second medium phase sensitivity position indication or to check the lane count provided by the lane counter 68, he merely throws the base line selector switch 78 to the Green position whereupon the 155 cycle signal developed by the reference receiver 54 and the 155 cycle beat signal produced by the receiver 55 no longer have any effect on the operation of the coarse position indicating facilities 75. The 95 cycle reference signal reproduced by the receiver 54 is passed through the filter 61 and through section 82 of the base selector switch to the terminals 84b of the phase discriminator and srevo-amplifier circuit while the 95 cycle beat signal developed by the receiver 55 is passed through the filter 76 and through the switch section 83 to the rotor winding of the control transformer or resolver 88. The switch section 81 supplies the output of the synchro transmitter 67 appearing upon conductor 67a to the synchro receiver 90 so that the rotor of the latter receiver is driven at a rate corresponding to the rate of rotation of the pointer 65. As will be understood from the foregoing description, the 95 cycle signals induced in the stator windings of the resolver 88 change in phase at a rate determined by the frequency difference between the 2100 kilocycle signals of the fine position indicating signal channel and the 1900 kilocycle signals of the medium ambiguity resolution channel or, more specifically, at a rate determined by the phantom frequency of approximately 200 kilocycles. Thus, the indication provided by the indicator 87, with the selector switch 78 in the Green position, is effective to identify the lane of the fine Green system when this indication is referred to the chart or nomograph of the survey area.

In the event that either of the medium position indications is not effective to provide an unambiguous identification of the lane count or mobile receiver position, the operator at the mobile receiving unit may request that the coarse position indicating facilities be rendered effective to obtain coarse position information. More specifically, if the medium position indications are not sufficient to provide unambiguous identification of the proper reading on the counters 68 and/or 73, the operator at the mobile receiver unit communicates with one of the shore fixed transmitting stations, preferably by radio wave transmission, and requests that the switch at that station be thrown to the "Coarse" position. The operator at the latter fixed transmitting station then communicates with the other transmitting stations to request that the switches 21, 30, 37 and 41 all be placed in their "Coarse" positions. The operator at the mobile unit, of course, places his switch 56 in the "Coarse" position and, during those periods when the coarse position indicating signals arrive simultaneously at the antenna 52 the coarse position information will be provided. More specifically, with the base line selector switch 78 in the Red position shown in FIG. 3, during those periods of operation when the two signals developed by the oscillators 19 and 33 arrive simultaneously at the antenna 52, the 155 cycle signal passed by the filter 77 is applied to the rotor winding of the control transformer 88. At the same time, the 155 cycle signal reproduced by the receiver 54 is passed through the filter 62 and through the switch section 82 to the input circuit 84b of the phase discriminator and servo-amplifier 84. The rotor of the control transformer 88 is again driven at a rate corresponding to the rate of rotation of the pointer 71 since the synchro receiver 90 receives input signals from the synchro transmitter 74 via conductor 74a and switch section 81. Thus, the phase of the output signal induced in the stator of the control transformer 88 changes as a function of the difference in frequency between the 2100 kilocycle signals of the fine position indicating channel and the 2080 kilocycle signals of the coarse position indicating channel. More specifically the signal output of the resolver 88 changes in phase at a rate which is determined by a difference or phantom frequency of approximately 20 kilocycles, which is about one-tenth the rate of change of the signals produced by the resolver 88 when the medium position indications are being obtained and about one one-hundredth of the rate of change of phase of the fine position indicating signals. The 155 cycle signal output of the resolver 88 is passed through the network 92 and through the switch section 80 to the second input circuit 84a of the phase discriminator and servo-amplifier 84. Thus, the pointer 86 changes at a rate determined by the 20 kilocycle phantom frequency difference between the fine position indicating channel and the coarse ambiguity resolution channel and, as a consequence, the indicator 87 provides an indication to identify the position of the mobile receiver 10 relative to widely spaced hyperbolic lines having foci at the units 12 and 13 and spaced apart along the base line 16 by a distance approximately equal to one-half wavelength of the 20 kilocycle difference frequency. The latter indication is sufficient to identify the lane of the medium system having foci at the stations 12 and 13 in order to resolve any ambiguities in the medium position indicating readings.

To obtain a second coarse position indication, the base line selector switch 78 is thrown to the Green position. During the periods of operation when the two signals developed by the oscillators 19 and 26 arrive at the antenna 52 simultaneously, the mobile receiving equipment is effective to provide a coarse position indication on the indicator 87 utilizing the 95 cycle reference signal developed by the receiver 54 and the 95 cycle beat signal developed by the receiver 55. The manner in which this indication is provided is believed to be obvious in view of the foregoing description. The coarse indication is used to determine the lane of the medium Green system having foci at the stations 11 and 12 in order to resolve any ambiguities of the Green medium phase indications.

Figure 4:
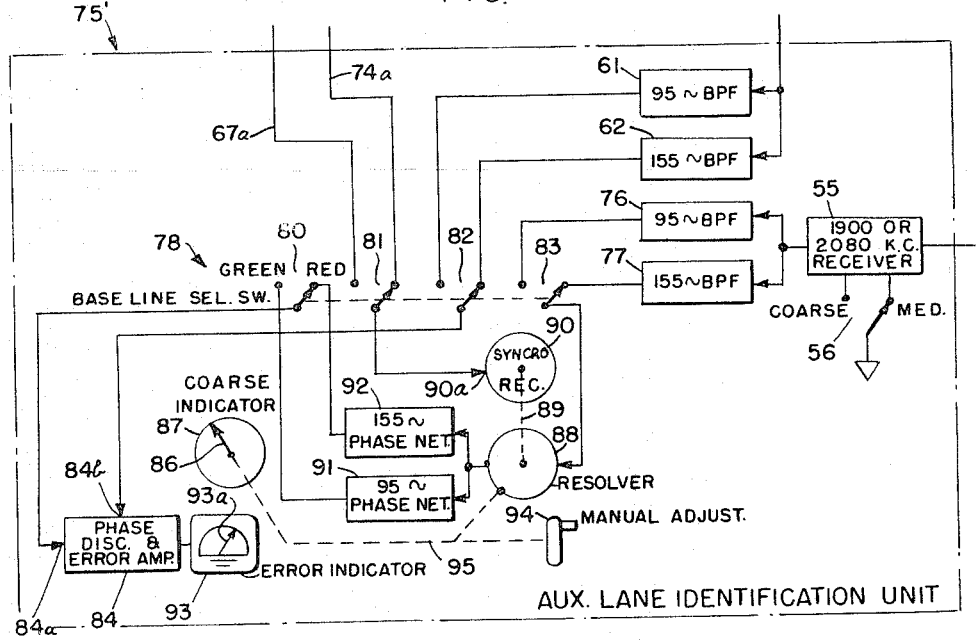
FIG. 4 illustrates an alternative arrangement of the lane identification facilities which may be employed at the mobile receiving unit to provide lane identification information.

In the arrangement shown in FIG. 3 a servo-motor 85 is employed to drive the coarse indicating meter, but, if desired, this servo-motor may be eliminated and a manual drive system employed as illustrated in FIG. 4 where the lane identification facilities are indicated generally by the reference numeral 75'. Since the latter lane identification facilities employ many circuit components similar to those of the equipment 75 described above, corresponding reference numerals have been used. As will be observed by reference to FIG. 4, the primary difference between the arrangement there shown and that shown in FIG. 3 is the use of a null indicating meter 93 at the output of the phase discriminator and servo-amplifier 84. This null indicator provides a zero or null indication whenever the two signals applied to the input circuits 84a and 84b are in phase but the needle 93a of the meter is deflected either to the left or to the right of the center or null position when the two input signals are out of phase, the direction of the deflection being determined by the direction of the phase unbalance and the magnitude of the deflection being determined by the magnitude of the unbalance. If the meter 93 indicates an out of phase condition, a hand operated crank 94, which is connected via a mechanical connection indicated generally by the broken line 95, to the casing of the control transformer or resolver 88, may be turned in order to change the phase of the signal applied to the input circuit 84a until the balanced condition is reached. The deflection of the needle 93a informs the operator as to which direction the crank 94 must be turned to achieve the balanced condition. The mechanical connection 95 also drives the pointer 86 of the indicator 87 and, hence, the latter indicator provides an indication or measurement of the phase relationship between the two signals applied to the input circuits 84a and 84b. In view of the foregoing description, it will be understood that the switch 56 may be manipulated to permit the indicator 87 to provide either a medium phase sensitivity position indication or a coarse phase sensitivity position indication while the base line selector switch 78 may be manipulated to permit the indicator 87 to provide these medium and coarse position indications for either set of base line stations.

Figure 5:
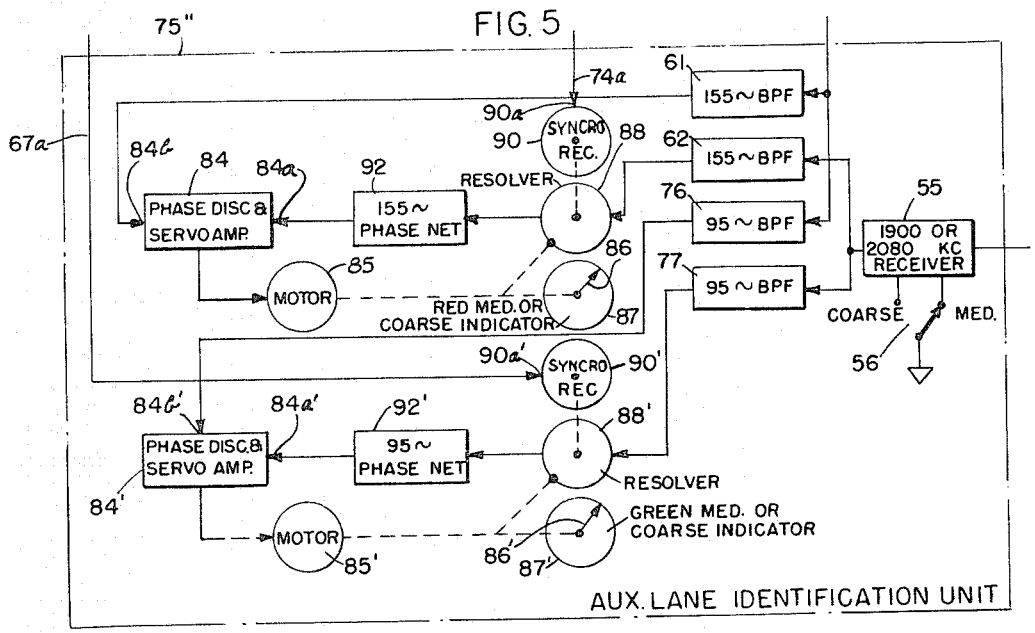
FIG. 5 is a diagrammatic representation of another form of lane identification equipment which may be employed at the mobile station to provide lane identification information.

The base line selector switch 78 may be eliminated and additional equipment employed to provide continuous medium or coarse position indications for each of the sets of base line stations by employing lane identification facilities 75" of the type illustrated in FIG. 5. Here again, the unit 75" employs a number of circuit components which are identical to corresponding components of unit 75 described above and, hence, corresponding reference numerals have been used to avoid repetition of the description. These identical components will not be described in detail.

It will be observed that in the arrangement shown in FIG. 5 the rotor winding of the resolver 88 is directly connected to the output of the filter 62 and the synchro receiver 90 is connected directly to the conductor 74a so that the stator windings of the resolver 88 have induced therein only 155 cycle signals which are passed through the filter 92 to the signal input circuit 84a of the phase discriminator and servo-amplifier 84. The second signal input circuit 84b of the circuit 84 is connected directly to the output of the filter 61. As will be understood from the foregoing description, the circuit 84 develops a drive signal for the servo-motor 85 whenever the two 155 cycle signals applied to its input circuits 84a and 84b are not in phase so that the output of the servo-motor drives a pointer 86 to indicate the phase relationship between the two 155 cycle signals applied to the circuits 84a and 84b. As long as the switch 56 remains in the fine position the indicator 87 provides a medium phase sensitivity position indication for the Red system in the manner described above. If the switch 56 is thrown to the coarse position the indicator 87 provides a coarse or low phase sensitivity position indication in a manner which will be apparent from the foregoing descripton. A second indicator 87' provides medium and coarse position indications for the Green system, the medium position phase sensitivity position indication being provided when the switch 56 is in the medium position shown in FIG. 5 and the coarse position indications being provided when the latter switch is thrown into the coarse position. The pointer 86' of the phase indicator 87' is driven by a servo-motor 85' which is, in turn, excited from a phase discriminator and servo-amplifier 84'. The latter amplifier has one signal input circuit 84b' connected directly to the output of the 95 cycle band pass filter 76 while a second input circuit 84a' is connected to the output of a phase network 92' which is excited by signals induced in the stator of a resolver or control transformer 88'. The rotor winding of the latter control transformer is connected directly to the output of the 95 cycle band pass filter 77 and the rotor is driven by a synchro receiver 90' having an input circuit 90a' connected directly to the lead 67a from the synchro transmitter 67 of the fine Green position indicating equipment. The signal induced in the stator of the control transformer 88' thus changes in phase at a rate corresponding to the 200 kilocycle difference between the fine position indicating signal channel and the medium ambiguity resolution channel when the switch 56 is in the medium position. This induced signal is passed through the network 92' and is phase compared in the phase discrimination 84' with the 95 cycle reference signal passed by the filter 76. The pointer 86' thus provides a continuous indication of the position of the mobile craft relative to the medium Green system as will be apparent from the foregoing description.

When the switch 56 is in the coarse position, the phase discriminator 84' compares the phase of the 95 cycle reference signal from the filter 76 with the 95 cycle beat signal passed by the network 92' so that the indicator 87' provides a coarse or low phase sensitivity position indication as described above.

If desired, the switches 21, 30 and 37, instead of being manually operated as described, could be driven by a synchronous motor at each transmitting station which would operate at a suitable rate to render the medium and coarse ambiguity resolution channels alternately effective during periods of interruption of the fine position indicating signals. If the operators at all of the transmitting stations were to start the synchronous operation of their motors at the same time, the frequencies at the various stations will change in the proper sequence although it may be necessary to provide fork controlled oscillators to control the motor driven switch rates very accurately to make certain that the emdium transmitting facilities at the different stations are effective at the same time and that the coarse transmitting facilities are also effective at the same time. Of course, the operation of the gate circuits 20, 27 and 34 will insure that the medium ambiguity resolution signals are actually radiated simultaneously for only particular portions of the cycle and the same is true of the coarse signals. Of course, the switch 41 at the reference station must be operated synchronously with the other switches 21, 30 and 37 if an automatic switching system is employed.

While particular embodiments of the invention have been illustrated and described, it will be recognized that many modifications and changes will readily occur to those skilled in this art and it is, therefore, contemplated by the appended claims to cover any such modifications as fall within the true spirit and scope of the invention.

What is claimed as new and desired to be secured by Letters Patent of the United States is:

1. A radio position finding system of the hyperbolic continuous wave type comprising three spaced apart transmitting units each including means for generating a position indicating signal and means for generating at least one ambiguity resolution signal, said position indicating signals being of different frequency but falling within a single frequency channel, said ambiguity resolution signals also being of different frequency and falling within another frequency channel, switching means at each of said units for alternately radiating the position indicating signal and the ambiguity resolution signal from that unit, the switching means at the three units being operated independently of each other and that at the first of said units being operated at a different swtching rate than those at a second and third of said units, a reference transmitting station spaced from said three units and including means for receiving and heterodyning in pairs the three ambiguity resolution signals to develop a first beat signal as a result of heterodyning the ambiguity resolution signals from the first and second units and to develop a second beat signal as a result of heterodyning the ambiguity resolution signals from the first and third units and for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for generating and radiating a carrier wave, means for modulating said carrier wave with first, second, third and fourth reference signals respectively derived from said first, second, third and fourth beat signals, a mobile receiving unit including means for receiving said carrier wave and detecting the four reference signals, for receiving and heterodyning in pairs the three ambiguity resolution signals to develop a fifth beat signal as a result of heterodyning the ambiguity resolution signals received from the first and second units and to develop a sixth beat signal as a result of heterodyning the ambiguity resolution signals received from the first and third units, and for receiving and heterodyning in pairs the three position indicating signals to develop a seventh beat signal as a result of heterodyning the position indicating signals received from the first and second units and to develop an eighth beat signal as a result of heterodyning the position indicating signals received from the first and third units, means jointly responsive to the seventh beat signal and the third reference signal to produce a first fine position indication identifying the location of the mobile receiving unit relative to the first and second units, means jointly responsive to the eighth beat signal and the fourth reference signal for providing a second fine position indication identifying the location of the mobile receiving unit relative to the first and third units, means jointly responsive to the first and third reference signals and to the fifth and seventh beat signals for providing a first coarse position indication identifying the location of the mobile receiving unit relative to the first and second units, and means jointly responsive to the second and fourth reference signals and the sixth and eighth beat signals for providing a second coarse position indicating signal identifying the position of the mobile receiving unit relative to said first and third units.

2. A radio position finding system of the hyperbolic continuous wave type comprising three spaced apart transmitting units each including means for generating a position indicating signal and means for generating at least one ambiguity resolution signal, switching means at each of said units for alternately radiating the position indicating signal and the ambiguity resolution signal from that unit, the switching means at the three units being operated independently of each other and that at the first of said units being operated at a different switching rate than those at a second and third of said units, a reference transmitting station spaced from said three units and including means for receiving and heterodyning in pairs the three ambiguity resolution signals to develop a first beat signal as a result of heterodyning the ambiguity resolution signals from the first and second units and to develop a second beat signal as a result of heterodyning the ambiguity resolution signals from the first and third units and for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for generating and radiating a carrier wave, means for modulating said carrier wave with first, second, third and fourth reference signals respectively derived from said first, second, third and fourth beat signals, a mobile receiving unit including means for receiving said carrier wave and detecting the four reference signals, for receiving and heterodyning in pairs the three ambiguity resolution signals to develop a fifth beat signal as a result of heterodyning the ambiguity resolution signals received from the first and second units and to develop a sixth beat signal as a result of heterodyning the ambiguity resolution signals received from the first and third units, and for receiving and heterodyning in pairs the three position indicating signals to develop a seventh beat signal as a result of heterodyning the position indicating signals received from the first and second units and to develop an eighth beat signal as a result of heterodyning the position indicating signals received from the first and third units, means jointly responsive to the seventh beat signal and the third reference signal to produce a first fine position indication identifying the location of the mobile receiving unit relative to the first and second units, means jointly responsive to the eighth beat signal and the fourth reference signal for providing a second fine position indication identifying the location of the mobile receiving unit relative to the first and third units, means jointly responsive to the first and third reference signals and to the fifth and seventh beat signals for providing a first coarse position indication identifying the location of the mobile receiving unit relative to the first and second units, and means jointly responsive to the second and fourth reference signals and the sixth and eighth beat signals for providing a second coarse position indicating signal identifying the position of the mobile receiving unit relative to said first and third units.

3. A radio position finding system of the hyperbolic continuous wave type comprising three spaced apart transmitting units each including means for generating a position indicating signal and means for generating at least one ambiguity resolution signal, switching means at each of said units for alternately radiating the position indicating signal and the ambiguity resolution signal from that unit, the switching means at the three units being operated independently of each other and that at the first of said units being operated at a different switching rate than those at a second and third of said units, fixedly positioned means in said system for receiving and heterodyning in pairs the three ambiguity resolution signals to develop a first beat signal as a result of heterodyning the ambiguity resolution signals from the first and second units and to develop a second beat signal as a result of heterodyning the ambiguity resolution signals from the first and third units and for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means for radiating first, second, third and fourth reference signals respectively derived from said first, second, third and fourth beat signals, a mobile receiving unit including means for receiving and detecting the four reference signals, for receiving and heterodyning in pairs the three ambiguity resolution signals to develop a fifth beat signal as a result of heterodyning the ambiguity resolution signals received from the first and second units and to develop a sixth beat signal as a result of heterodyning the ambiguity resolution signals received from the first and third units, and for receiving and heterodyning in pairs the three position indicating signals to develop a seventh beat signal as a result of heterodyning the position indicating signals received from the first and second units and to develop an eighth beat signal as a result of heterodyning the position indicating signals received from the first and third units, means jointly responsive to the seventh beat signal and the third reference signal to produce a first fine position indication identifying the location of the mobile receiving unit relative to the first and second units, means jointly responsive to the eighth beat signal and the fourth reference signal for providing a second fine position indication identifying the location of the mobile receiving unit relative to the first and third units, means jointly responsive to the first and third reference signals and to the fifth and seventh beat signals for providing a first coarse position indication identifying the location of the mobile receiving unit relative to the first and second units, and means jointly responsive to the second and fourth reference signals and the sixth and eighth beat signals for providing a second coarse position indicating signal identifying the position of the mobile receiving unit relative to said first and third units.

4. A transmitting system for use in position finding systems of the hyperbolic continuous wave type and comprising three spaced apart transmitting units each including means for generating a position indicating signal and means for generating at least one ambiguity resolution signal, said position indicating signals being of different frequency but falling within a single frequency channel, said ambiguity resolution signals also being of different frequency and falling within another frequency channel, switching means at each of said units for alternately radiating the position indicating signal and the ambiguity resolution signal from that unit, the switching means at the three units being operated independently of each other and that at the first of said units being operated at a different switching rate than those at a second and third of said units, a reference transmitting station spaced from said three units and including means for receiving and heterodyning in pairs the three ambiguity resolution signals to develop a first beat signal as a result of heterodyning the ambiguity resolution signals from the first and second units and to develop a second beat signal as a result of heterodyning the ambiguity resolution signals from the first and third units and for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for generating and radiating a carrier wave, and means for modulating said carrier wave with first, second, third and fourth reference signals respectively derived from said first, second, third and fourth beat signals.

5. A transmitting system for use in position in finding systems of the hyperbolic continuous wave type and comprising three spaced apart transmitting units each including means for generating a position indicating signal and means for generating at least one ambiguity resolution signal, switching means at each of said units for alternately radiating the position indicating signal and the ambiguity resolution signal from that unit, the switching means at the three units being operated independently of each other and that at the first of said units being operated at a different switching rate than those at a second and third of said units, a reference transmitting station spaced from said three units and including means for receiving and heterodyning in pairs the three ambiguity resolution signals to develop a first beat signal as a result of heterodyning the ambiguity resolution signals from the first and second units and to develop a second beat signal as a result of heterodyning the ambiguity resolution signals from the first and third units and for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for generating and radiating a carrier wave and means for modulating said carrier wave with first, second, third and fourth reference signals respectively derived from said first, second, third and fourth beat signals.

6. A transmitting system for use in position finding systems of the hyperbolic continuous wave type and comprising three spaced apart transmitting units each including means for generating a position indicating signal and means for generating at least one ambiguity resolution signal, switching means at each of said units for alternately radiating the position indicating signal and the ambiguity resolution signal from that unit, the switching means at the three units being operated independently of each other and that at the first of said units being operated at a different switching rate than those at a second and third of said units, fixedly positioned means in said transmitting system for receiving and heterodyning in pairs the three ambiguity resolution signals to develop a first beat signal as a result of heterodyning the ambiguity resolution signals from the first and second units and to develop a second beat signal as a result of heterodyning the ambiguity resolution signals from the first and third units and for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, and means for radiating first, second, third and fourth reference signals respectively derived from said first, second, third and fourth beat signals.

7. A radio position finding system of the hyperbolic continuous wave type comprising first, second and third spaced apart transmitting units, means at each of said units for generating a position indicating signal, a medium ambiguity resolution signal and a coarse ambiguity resolution signal, the three position indicating signals differing from each other in frequency but falling within a first frequency channel, the three medium ambiguity resolution signals differing from each other in frequency and falling within a second frequency channel distinguishable from said first channel, the three coarse ambiguity resolution signals differing from each other in frequency and falling within a third channel distinguishable from said first and second channels, the difference in frequency between the two coarse ambiguity resolution signals respectively radiated from the first and second units being equal to the difference between the two medium ambiguity resolution signals respectively radiated from these same units, the difference in frequency between the two coarse ambiguity resolution signals respectively radiated from the first and third units being equal to the difference in frequency between the two medium ambiguity resolution signals respectively radiated from these same units, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the three units being operated independently of each other and the switching means at the first unit being three of said units and including means for generating and third units, a reference transmitting station spaced from all three of said units and including means for generating and radiating a carrier wave, means at said station for receiving and heterodyning in pairs the three medium ambiguity resolution signals to develop a first beat signal as a result of heterodyning the medium ambiguity resolution signals from the first and second units and to develop a second beat signal as a result of heterodyning the medium ambiguity resolution signals from the first and third units when the selector means at said units are effective to cause radiation of the medium ambiguity resolution signals, means at said station for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for receiving and heterodyning in pairs the three coarse ambiguity resolution signals to develop a fifth beat signal as a result heterodyning the coarse position indicating signals received from said first and second units and to develop a sixth beat signal as a result of heterodyning the coarse ambiguity resolution signals radiated from said first and third units when the selector means at said units are effective to cause radiation of the coarse ambiguity signals, means for modulating said carrier wave with first, second, third, fourth, fifth and sixth reference signals respectively derived from said first, second, third, fourth, fifth and sixth beat signals, a mobile receiving unit including means for receiving said carrier wave and detecting the six reference signals, for receiving and heterodyning in pairs the three medium ambiguity resolution signals to develop a seventh beat signal as a result of heterodyning the medium ambiguity resolution signals received from the first and second units and to develop an eighth beat signal as a result of heterodyning the medium ambiguity resolution signals received from the first and third units, for receiving and heterodyning in pairs the three position indicating signals to develop a ninth beat signal as a result of heterodyning the position indicating signals received from the first and second units and to develop a tenth beat signal as a result of heterodyning the position indicating signals received from the first and third units, and for receiving and heterodyning in pairs the three coarse ambiguity resolution signals to develop an eleventh beat signal as a result of heterodyning the coarse ambiguity resolution signals received from the first and second units and to develop a twelfth beat signal as a result of heterodyning the coarse position indicating signals received from the first and third units, means jointly responsive to the ninth beat signal and the third reference signal to produce a first fine position indication identifying the location of the mobile receiving unit relative to the first and second units, means jointly responsive to the tenth beat signal and the fourth reference signal for providing a second fine position indication identifying the location of the mobile receiving unit relative to the first and third units, means jointly responsive to the first and third reference signals and to the seventh and ninth beat signals for providing a first medium position indication identifying the location of the mobile receiving unit relative to the first and second units, means jointly responsive to the second and fourth reference signals and the eighth and tenth beat sgnals for providing a second medium position indicating signal identifying the positon of the mobile receving unit relative to said first and third units, means jointly responsive to the third and fifth reference signals and to the ninth and eleventh beat signals for providing a first coarse position indication identifying the location of the mobile receiving unit relative to the first and second units, and means jointly responsive to the fourth and sixth reference signals and to the tenth and twelfth beat signals for providing a second coarse position indication identifying the location of the mobile receiving unit relative to the first and third units.

8. A radio position finding system of the hyperbolic continuous wave type comprising first, second and third spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the three units being operated independently of each other and the switching means at the first unit being switched at a different rate from those at the second and third units, a reference transmitting station spaced from all three of said units and including means for generating and radiating a carrier wave, means at said station for receiving and heterodyning in pairs the three medium ambiguity resolution signals to develop a first beat signal as a result of heterodyning the medium ambiguity resolution signals from the first and second units and to develop a second beat signal as a result of heterodyning the medium ambiguity resolution signals from the first and third units when the selector means at said units are effective to cause radiation of the medium ambiguity resolution signals, means at said station for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for receiving and heterodyning in pairs the three coarse ambiguity resolution signals to develop a fifth beat signal as a result of heterodyning the coarse position indicating signals received from said first and second units and to develop a sixth beat signal as a result of heterodyning the coarse ambiguity resolution signals radiated from said first and third units when the selector means at said units are effective to cause radiation of the coarse ambiguity resolution signals, means for modulating said carrier wave with first, second, third, fourth, fifth and sixth reference signals respectively derived from said first, second, third, fourth, fifth and sixth beat signals, a mobile receiving unit including means for receiving said carrier wave and detecting the six reference signals, for receiving and heterodyning in pairs the three medium ambiguity resolution signals to develop a seventh beat signal as a result of heterodyning the medium ambiguity resolution signals received from the first and second units and to develop an eighth beat signal as a result of heterodyning the medium ambiguity resolution signals received from the first and third units, for receiving and heterodyning in pairs the three position indicating signals to develop a ninth beat signal as a result of heterodyning the position indicating signals received from the first and second units and to develop a tenth beat signal as a result of heterodyning the position indicating signals received from the first and third units, and for receiving and heterodyning in pairs the three coarse ambiguity resolution signals to develop an eleventh beat signal as a result of heterodyning the coarse ambiguity resolution signals received from the first and second units and to develop a twelfth beat signal as a result of heterodyning the coarse position indicating signals received from the first and third units, means jointly responsive to the ninth beat signal and the third reference signal to produce a first fine position indication identifying the location of the mobile receiving unit relative to the first and second units, means jointly responsive to the tenth beat signal and the fourth reference signal for providing a second fine position indication identifying the location of the mobile receiving unit relative to the first and third units, means jointly responsive to the first and third reference signals and to the seventh and ninth beat signals for providing a first medium position indication identifying the location of the mobile receiving unit relative to the first and second units, means jointly responsive to the second and fourth reference signals and the eighth and tenth beat signals for providing a second medium position indicating signal identifying the position of the mobile receiving unit relative to said first and third units, means jointly responsive to the third and fifth reference signals and to the ninth and eleventh beat signals for providing a first coarse position indication identifying the location of the mobile receiving unit relative to the first and second units, and means jointly responsive to the fourth and sixth reference signals and to the tenth and twelfth beat signals for providing a second coarse position indication identifying the location of the mobile receiving unit relative to the first and third units.

9. A radio position finding system of the hyperbolic continuous wave type comprising first, second and third spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the three units being operated independently of each other and the switching means at the first unit being switched at a different rate from those at the second and third units, fixedly positioned means for receiving and heterodyning in pairs the three medium ambiguity resolution signals to develop a first beat signal as a result of heterodyning the medium ambiguity resolution signals from the first and second units and to develop a second beat signal as a result of heterodyning the medium ambiguity resolution signals from the first and third units when the selector means at said units are effective to cause radiation of the medium ambiguity resolution signals, for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, and for receiving and heterodyning in pairs the three coarse ambiguity resolution signals to develop a fifth beat signal as a result of heterodyning the coarse position indicating signals received from said first and second units and to develop a sixth beat signal as a result of heterodyning the coarse ambiguity resolution signals radiated from said first and third units when the selector means at said units are effective to cause radiation of the coarse ambiguity resolution signals, means for radiating first, second, third, fourth, fifth and sixth reference signals respectively derived from said first, second, third, fourth, fifth and sixth beat signals, a mobile receiving unit including means for receiving and detecting the six reference signals, for receiving and heterodyning in pairs the three medium ambiguity resolution signals to develop a seventh beat signal as a result of heterodyning the medium ambiguity resolution signals received from the first and second units and to develop an eighth beat signal as a result of heterodyning the medium ambiguity resolution signals received from the first and third units, for receiving and heterodyning in pairs the three position indicating signals to develop a ninth beat signal as a result of heterodyning the position indicating signals received from the first and second units and to develop a tenth beat signal as a result of heterodyning the position indicating signals received from the first and third units, and for receiving and heterodyning in pairs the three coarse ambiguity resolution signals to develop an eleventh beat signal as a result of heterodyning the coarse ambiguity resolution signals received from the first and second units and to develop a twelfth beat signal as a result of heterodyning the coarse position indicating signals received from the first and third units, means jointly responsive to the ninth beat signal and the third reference signal to produce a first fine position indication identifying the location of the mobile receiving unit relative to the first and second units, means jointly responsive to the tenth beat signal and the fourth reference signal for providing a second fine position indication identifying the location of the mobile receiving unit relative to the first and third units, means jointly responsive to the first and third reference signals and to the seventh and ninth beat signals for providing a first medium position indication identifying the location of the mobile receiving unit relative to the first and second units, means jointly responsive to the second and fourth reference signals and the eighth and tenth beat signals for providing a second medium position indicating signal identifying the position of the mobile receiving unit relative to said first and third units, means jointly responsive to the third and fifth reference signals and to the ninth and eleventh beat signals for providing a fifth coarse position indication identifying the location of the mobile receiving unit relative to the first and second units, and means jointly responsive to the fourth and sixth reference signals and to the tenth and twelfth beat signals for providing a second coarse position indication identifying the location of the mobile receiving unit relative to the first and third units.

10. A transmitting system for use in radio location systems of the hyperbolic continuous wave type and comprising a pair of spaced apart transmitting units each including means for generating a position indicating signal and means for generating at least one ambiguity resolution signal, said position indicating signals being of different frequency but falling within a single frequency channel, said ambiguity resolution signals also being of different frequency and falling within another frequency channel, switching means at each of said units for alternately radiating the position indicating signal and the ambiguity resolution signal from that unit, the switching means at the two units being operated independently of each other and at different switching rates, a reference transmitting station spaced from said three units and including means for receiving and heterodyning the two ambiguity resolution signals to develop a first beat signal and for receiving and heterodyning in pairs the two position indicating signals to develop a second beat signal, means at said reference station for generating and radiating a carrier wave, and means for modulating said carrier wave with first and second reference signals respectively derived from said first and second beat signals.

11. A transmitting system for use in radio location systems for the hyperbolic continuous wave type and comprising a pair of spaced apart transmitting units each including means for generating a position indicating signal and means for generating at least one ambiguity resolution signal, switching means at each of said units for alternately radiating the position indicating signal and the ambiguity resolution signal from that unit, the switching means at the two units being operated independently of each other and at different switching rates, a reference transmitting station spaced from said three units and including means for receiving and heterodyning the two ambiguity resolution signals to develop a first beat signal and for receiving and heterodyning in pairs the two position indicating signals to develop a second beat signal, means at said reference station for generating and radiating a carrier wave, and means for modulating said carrier wave with first and second reference signals respectively derived from said first and second beat signals.

12. A transmitting system for use in radio location systems of the hyperbolic continuous wave type and comprising a pair of spaced apart transmitting units each including means for generating a position indicating signal and means for generating at least one ambiguity resolution signal, switching means at each of said units for alternately radiating the position indicating signal and the ambiguity resolution signal from that unit, the switching means at the two units being operated independently of each other and at different switching rates, a fixedly positioned reference station for receiving and heterodyning the two ambiguity resolution signals to develop a first beat signal and for receiving and heterodyning in pairs the two position indicating signals to develop a second beat signal, means at said reference station for generating and radiating a carrier wave, and means for radiating first and second reference signals respectively derived from said first and second beat signals.

13. A transmitting system for use in radio position finding systems of the hyperbolic continuous wave type and comprising first, second and third spaced apart transmitting units, means at each of said units for generating a position indicating signal, a medium ambiguity resolution signal and a coarse ambiguity resolution signal, the three position indicating signals differing from each other in frequency but falling within a first frequency channel, the three medium ambiguity resolution signals differing from each other in frequency and falling within a second frequency channel distinguishable from said first channel, the three coarse ambiguity resolution signals differing from each other in frequency and falling within a third frequency channel distinguishable from said first and second channels, the difference in frequency between the two coarse ambiguity resolution signals respectively radiated from the first and second units being equal to the difference in frequency between the two medium ambiguity resolution signals respectively radiated from these same units, the difference in frequency between the two coarse ambiguity resolution signals respectively radiated from the first and third units being equal to the difference in frequency between the two medium ambiguity resolution signals respectively radiated from these same units, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the three units being operated independently of each other and the switching means at the first unit being switched at a different rate from those at the second and third units, a reference transmitting station spaced from all three of said units and including means for generating and radiating a carrier wave, means at said station for receiving and heterodyning in pairs the three medium ambiguity resolution signals to develop a first beat signal as a result of heterodyning the medium ambiguity resolution signals from the first and second units and to develop a second beat signal as a result of heterodyning the medium ambiguity resolution signals from the first and third units when the selector means at the first unit being switched at a different rate medium ambiguity resolution signals, means at said station for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for receiving and heterodyning in pairs the three coarse ambiguity resolution signals to develop a fifth beat signal as a result of heterodyning the coarse position indicating signals received from said first and second units and to develop a sixth beat signal as a result of heterodyning the coarse ambiguity resolution signals radiated from said first and third units when the selector means at said units are effective to cause radiation of the coarse ambiguity resolution signals, and means for modulating said carrier wave with first, second, third, fourth, fifth and sixth reference signals respectively derived from said first, second, third, fourth, fifth and sixth beat signals.

14. A transmitting system for use in radio position finding systems of the hyperbolic continuous wave type and comprising first, second and third spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the three units being operated independently of each other and the switching means at the first unit being switched at a different rate from those at the second and third units, a reference transmitting station spaced from all three of said units and including means for generating and radiating a carrier wave, means at said station for receiving and heterodyning in pairs the three medium ambiguity resolution signals to develop a first beat signal as a result of heterodyning the medium ambiguity resolution signals from the first and second units and to develop a second beat signal as a result of heterodyning the medium ambiguity resolution signals from the first and third units when the selector means at said units are effective to cause radiation of the medium ambiguity resolution signals, means at said station for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, means at said reference station for receiving and heterodyning in pairs the three coarse ambiguity resolution signals to develop a fifth beat signal as a result of heterodyning the coarse position indicating signals received from said first and second units and to develop a sixth beat signal as a result of heterodyning the coarse ambiguity resolution signals radiated from said first and third units when the selector means at said units are effective to cause radiation of the coarse ambiguity resolution signals, and means for modulating said carrier wave with first, second, third, fourth, fifth and sixth reference signals respectively derived from said first, second, third, fourth, fifth and sixth beat signals.

15. A transmitting system for use in radio position finding systems of the hyperbolic continuous wave type and comprising first, second and third spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the three units being operated independently of each other and the switching means at the first unit being switched at a different rate from those at the second and third units, fixedly positioned means for receiving and heterodyning in pairs the three medium ambiguity resolution signals to develop a first beat signal as a result of heterodyning the medium ambiguity resolution signals from the first and second units and to develop a second beat signal as a result of heterodyning the medium ambiguity resolution signals from the first and third units when the selector means at said units are effective to cause radiation of the medium ambiguity resolution signals, for receiving and heterodyning in pairs the three position indicating signals to develop a third beat signal as a result of heterodyning the position indicating signals received from the first and second units and to develop a fourth beat signal as a result of heterodyning the position indicating signals received from the first and third units, and for receiving and heterodyning in pairs the three coarse ambiguity resolution signals to develop a fifth beat signal as a result of heterodyning the coarse position indicating signals received from said first and second units and to develop a sixth beat signal as a result of heterodyning the coarse ambiguity resolution signals radiated from said first and third units when the selector means at said units are effective to cause radiation of the coarse ambiguity resolution signals, and means for radiating first, second, third, fourth, fifth and sixth reference signals respectively derived from said first, second, third, fourth, fifth and sixth beat signals.

16. A radio location system of the hyperbolic continuous wave type comprising first and second spaced apart transmitting units, means at each of said units for generating a position indicating signal, a medium ambiguity resolution signal and a coarse ambiguity resolution signal, the two position indicating signals differing from each other in freqeuncy but falling within a first frequency channel, the two medium ambiguity resolution signals differing from each other in frequency and falling within a second frequency channel distinguishable from said first channel, the two coarse ambiguity resolution signals differing from each other in frequency and falling within a third frequency channel distinguishable from said first and second channels, the difference in frequency between the two coarse ambiguity resolution signals respectively radiated from the first and second units being equal to the difference in frequency between the two medium ambiguity resolutions signals respectively radiated from these same units, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the two units being operated independently of each other and the switching means at the first unit being switched at a different rate from that at the second unit, a reference transmitting station spaced from both of said units and including means for generating and radiating a carrier wave, means at said station for receiving and heterodyning the two medium ambiguity resolution signals to develop a first beat signal when the selector means at said units are effective to cause radiation of the medium ambiguity resolution signals, means at said station for receiving and heterodyning the two position indicating signals to develop a second beat signal, means at said reference station for receiving and heterodyning the two coarse ambiguity resolution signals to develop a third beat signal when the selector means at said units are effective to cause radiation of the coarse ambiguity resolution signals, means for modulating said carrier wave with first, second and third reference signals respectively derived from said first, second and third beat signals, a mobile receiving unit including means for receiving said carrier wave and detecting the three reference signals, for receiving and heterodyning the two medium ambiguity resolution signals to develop a fourth beat signal for receiving and heterodyning in pairs the two position indicating signals to develop a fifth beat signal and for receiving and heterodyning the two coarse ambiguity resolution signals to develop a sixth beat signal, means jointly responsive to the fifth beat signal and the second reference signal to produce a fine position indication identifying the location of the mobile receiving unit relative to the first and second units, means jointly responsive to the first and second reference signals and to the fourth and fifth beat signals for providing a medium position indication identifying the location of the mobile receiving unit relative to the first and second units, and means jointly responsive to the second and third reference signals and to the fifth and sixth beat signals for providing a coarse position indication identifying the location of the mobile receiving unit relative to the first and second units.

17. A radio location system of the hyperbolic continuous wave type comprising first and second spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the two units being operated independently of each other and the switching means at the first unit being switched at a different rate from that at the second unit, a reference transmitting station spaced from both of said units and including means for generating and radiating a carrier wave, means at said station for receiving and heterodyning the two medium ambiguity resolution signals to develop a first beat signal when the selector means at said units are effective to cause radiation of the medium ambiguity resolution signals, means at said station for receiving and heterodyning the two position indicating signals to develop a second beat signal, means at said reference station for receiving and heterodyning the two coarse ambiguity resolution signals to develop a third beat signal when the selector means at said units are effective to cause radiation of the coarse ambiguity resolution signals, means for modulating said carrier wave with first, second and third reference signals respectively derived from said first, second and third beat signals, a mobile receiving unit including means for receiving said carrier wave and detecting the three reference signals, for receiving and heterodyning the two medium ambiguity resolution signals to develop a fourth beat signal, for receiving and heterodyning in pairs the two position indicating signals to develop a fifth beat signal and for receiving and heterodyning the two coarse ambiguity resolution signals to develop a sixth beat signal, means jointly responsive to the fifth beat signal and the second reference signal to produce a fine position indication identifying the location of the mobile receiving unit relative to the first and second units, means jointly responsive to the first and second reference signals and to the fourth and fifth beat signals for providing a medium position indication identifying the location of the mobile receiving unit relative to the first and second units, and means jointly responsive to the second and third reference signals and to the fifth and sixth beat signals for providing a coarse position indication identifying the location of the mobile receiving unit relative to the first and second units.

18. A radio location system of the hyperbolic continuous wave type comprising first and second spaced apart transmitting units, means at each of said units for generating a position indicating signal, a medium ambiguity resolution sgnal and acoarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the two units being operated independently of each other and the switching means at the first unit being switched at a different rate from that at the second unit, fixedly position means for receiving and heterodyning the two medium ambiguity resolution signals to develop a first beat signal when the selector means at said units are effective to cause radiation of the medium ambiguity resolution signals, for receiving and heterodyning the two position indicating signals to develop a second beat signal, and for receiving and heterodyning the two coarse ambiguity resolution signals to develop a third beat signal when the selector means at said units are effective to cause radiation of the coarse ambiguity resolution signals, means for radiating first, second and third reference signals respectively derived from said first, second and third beat signals, a mobile receiving unit including means for receiving and detecting the three reference signals, for receiving and heterodyning the two medium ambiguity resolution signals to develop a fourth beat signal, for receiving and heterodyning in pairs the two position indicating signals to develop a fifth beat signal, and for receiving and heterodyning the two coarse ambiguity resolution signals to develop a sixth beat signal, means jointly responsive to the fifth beat signal and the second reference signal to produce a fine position indication identifying the location of the mobile receiving unit relative to the first and second units, means jointly responsive to the first and second reference signals and to the fourth and fifth beat signals for providing a medium position indication identifying the location of the mobile receiving unit relative to the first and second units, and means jointly responsive to the second and third reference signals and to the fifth and sixth beat signals for providing a coarse position indication identifying the location of the mobile receiving unit relative to the first and second units.

19. Transmitting apparatus for use in radio location systems of the hyperbolic continuous wave type comprising first and second spaced apart transmitting units, means at each of said units for generating a position indicating signal, a medium ambiguity resolution signal and a coarse ambiguity resolution signal, the two position indicating signals differing from each other in frequency but falling within a first frequency channel, the two medium ambiguity resolution signals differing from each other in frequency and falling within a second frequency channel distinguishable from said first channel, the two coarse ambiguity resolution signals differing from each other in frequency and falling within a third frequency channel distinguishable from said first and second channels, the difference in frequency between the two coarse ambiguity resolution signals respectively radiated from the first and second units being equal to the difference in frequency between the two medium ambiguity resolution signals respectively radiated from these same units selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the two units being operated independently of each other and the switching means at the first unit being switched at a different rate from that at the second unit, a reference transmitting station spaced from both of said units and including means for generating and radiating a carrier wave, means at said station for receiving and heterodyning the two medium ambiguity resolution signals to develop a first beat signal when the selector means at said units are effective to cause radiation of the medium ambiguity resolution signals, means at said station for receiving and heterodyning the two position indicating signals to develop a second beat signal, means at said reference station for receiving and heterodyning the two coarse ambiguity resolution signals to develop a third beat signal when the selector means at said units are effective to cause radiation of the coarse ambiguity resolution signals, and means for modulating said carrier wave with first, second and third reference signals respectively derived from said first, second and third beat signals.

20. Transmitting apparatus for use in radio location systems of the hyperbolic continuous wave type comprising first and second spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the two units being operated independently of each other and the switching means at the first unit being switched at a different rate from that at the second unit, a reference transmitting station spaced from both of said units and including means for generating and radiating a carrier wave, means at said station for receiving and heterodyning the two medium ambiguity resolution signals to develop a first beat signal when the selector means at said units are effective to cause radiation of the medium ambiguity resolution signals, means at said station for receiving and heterodyning the two position indicating signals to develop a second beat signal, means at said reference station for receiving and heterodyning the two coarse ambiguity resoltuion signals to develop a third beat signal when the selector means at said units are effective to cause radiation of the coarse ambiguity resolution signals, and means for modulating said carrier wave with first, second and third reference signals respectively derived from said first, second and third beat signals.

21. Transmitting apparatus for use in radio location systems of the hyperbolic continuous wave type comprising first and second spaced apart transmitting units, means at each of said units for generating a position indicating signal, a medium ambiguity resolution signal and a coarse ambiguity resolution signal, selector means at each of said units for selecting either the medium ambiguity resolution signal or the coarse ambiguity resolution signal for radiation, switching means at each of said units for alternately radiating from that unit the position indicating signal and the ambiguity resolution signal selected by the selector means at that unit, the switching means at the two units being operated independently of each other and the switching means at the first unit being switched at a different rate from that at the second unit, fixedly positioned means for receiving and heterodyning the two medium ambiguity resolution signals to develop a first beat signal when the selector means at said units are effective to cause radiation of the medium ambiguity resolution signals, for receiving and heterodyning the two position indicating signals to develop a second beat signal, and for receiving and heterodyning the two coarse ambiguity resolution signals to develop a third beat signal when the selector means at said units are effective to cause radiation of the coarse ambiguity resolution signals, and means for radiating first, second and third reference signals respectively derived from said first, second and third beat signals.

22. A radio location system of the hyperbolic continous wave type comprising first and second spaced apart transmitting units each including means for generating a position indicating signal and means for generating at least one ambiguity resolution signal, said position indicating signals being of different frequency but falling within a single frequency channel, said ambiguity resolution signals also being of different frequency and falling within another frequency channel, switching means at each of said units for alternately radiating the position indicating signal and the ambiguity resolution signal from that unit, the switching means at the two units being operated independently of each other and at different switching rates, a reference transmitting station spaced from said units and including means for receiving and heterodyning the two ambiguity resolution signals to develop a first beat signal and for receiving and heterodyning the two position indicating signals to develop a second beat signal, means at said reference station for generating and radiating a carrier wave, means for modulating said carrier wave with first and second reference signals respectively derived from said first and second beat signals, a mobile receiving unit including means for receiving said carrier wave and detecting the two reference signals, for receiving and heterodyning the two ambiguity resolution signals to develop a third beat signal and for receiving and heterodyning the two position indicating signals to develop a fourth beat signal, means jointly responsive to the fourth beat signal and the second reference signal to produce a fine position indication identifying the location of the mobile receiving unit relative to the two units, and means jointly responsive to the first and second reference signals and to the third and fourth beat signals for providing a coarse position indication identifying the location of the mobile receiving unit relative to the first and second units.

23. A radio location system of the hyperbolic continuous wave type comprising first and second spaced apart transmitting units each including means for generating a position indicating signal and means for generating at least one ambiguity resolution signal, switching means at each of said units for alternately radiating the position indicating signal and the ambiguity resolution signal from that unit, the switching means at the two units being operated independently of each other and at different switching rates, a reference transmitting station spaced from said units and including means for receiving and heterodyning the two ambiguity resolution signals to develop a first beat signal and for receiving and heterodyning the two position indicating signals to develop a second beat signal, means at said reference station for generating and radiating a carrier wave, means for modulating said carrier wave with first and second reference signals respectively derived from said first and second beat signals, a mobile receiving unit including means for receiving said carrier wave and detecting the two reference signals, for receiving and heterodyning the two ambiguity resolution signals to develop a third beat signal and for receiving and heterodyning the two position indicating signals to develop a fourth beat signal, means jointly responsive to the fourth beat signal and the second reference signal to produce a fine position indication identifying the location of the mobile receiving unit relative to the two units, and means jointly responsive to the first and second reference signals and to the third and fourth beat signals for providing a coarse position indication identifying the location of the mobile receiving unit relative to the first and second units.

24. A radio location system of the hyperbolic continuous wave type comprising first and second spaced apart transmitting units each including means for generating a position indicating signal and means for generating at least one ambiguity resolution signal, switching means at each of said units for alternately radiating the position indicating signal and the ambiguity resolution signal from that unit, the switching means at the two units being operated independently of each other and at different switching rates, fixedly positioned means for receiving and heterodyning the two ambiguity resolution signals to develop a first beat signal and for receiving and heterodyning the two position indicating signals to develop a second beat signal, means for radiating first and second reference signals respectively derived from said first and second beat signals, a mobile receiving unit including means for receiving and detecting the two reference signals, for receiving and heterodyning the two ambiguity resolution signals to develop a third beat signal and for receiving and heterodyning the two position indicating signals to develop a fourth beat signal, means jointly responsive to the fourth beat signal and the second reference signal to produce a fine position indication identifying the location of the mobile receiving unit relative to the two units, and means jointly responsive to the first and second reference signals and to the third and fourth beat signals for providing a coarse position indication identifying the location of the mobile receiving unit relative to the first and second units.

25. Mobile receiving equipment for use in radio location systems of the type wherein at least three spaced apart transmitting stations are employed each radiating a position indicating signal and an ambiguity resolution signal and including fixed means for receiving and heterodyning the position indicating signals radiated from a first and second of said stations to develop a first beat signal, for receiving and heterodyning the position indicating signals radiated from the first and third of said units to develop a second beat signal, for receiving and heterodyning the ambiguity resolution signals radiated from said first and second units to develop a third beat signal, and for receiving and heterodyning the ambiguity resolution signals radiated from the first and third units to develop a fourth beat signal, together with means for radiating first, second, third and fourth reference signals respectively derived from said first, second, third and fourth beat signals, said equipment comprising means for receiving and detecting all four of the reference signals, means for receiving and heterodyning the ambiguity resolution signals from said first and second units to develop a fifth beat signal, for receiving and heterodyning the ambiguity resolution signals from the first and third units to develop a sixth beat signal, for receiving and heterodyning the position indicating signals from the first and second units to develop a seventh beat signal and for receiving and heterodyning the position indicating signals from the first and third units to develop an eighth beat signal, means jointly responsive to the seventh beat signal and the first reference signal to produce a first fine position indication identifying the location of the mobile receiving unit relative to the first and second units, means jointly responsive to the eighth beat signal and the second reference signal for providing a second fine position indication identifying the location of the mobile receiving unit relative to the first and third units, first coarse indicating means jointly responsive to the first and third reference signals and to the fifth and seventh beat signals for providing a first coarse position indication identifying the location of the mobile receiving unit relative to the first and second units, second coarse indicating means jointly responsive to the second and fourth reference signals and to the sixth and eighth beat signals for providing a second coarse position indicating signal identifying the position of the mobile receiving unit relative to said first and third units, and manually operated switch means controlling the first and second coarse position indicating means to render them selectively effective to provide their position indications.

26. Mobile receiving equipment for use in radio location systems of the type wherein at least three spaced apart transmitting units are employed each radiating a position indicating signal, a medium ambiguity resolution signal, a coarse ambiguity resolution signal and including fixed means for receiving and heterodyning the position indicating signals radiated from a first and second of said units to develop a first beat signal, for receiving and heterodyning the position indicating signals radiated from the first and third of said units to develop a second beat signal, for receiving and heterodyning the medium ambiguity resolution signals radiated from said first and second units to develop a third beat signal, for receiving and heterodyning the medium ambiguity resolution signals radiated from the first and third units to develop a fourth beat signal, for receiving and heterodyning the coarse ambiguity resolution signals from said first and second units to develop a fifth beat signal and for receiving and heterodyning the coarse ambiguity resolution signals from the first and third units to develop a sixth beat signal together with means for radiating first, second, third, fourth, fifth and sixth reference signals respectively derived from said first, second, third, fourth, fifth and sixth beat signals, said equipment comprising means for receiving and detecting all six of the reference signals, first receiving means for receiving and heterodyning the medium ambiguity resolution signals from said first and second units to develop a seventh beat signal, for receiving and heterodyning the medium ambiguity resolution signals received from the first and third units to develop an eighth beat signal, receiving and heterodyning the coarse ambiguity resolution signals from the first and second units to develop a ninth beat signal, and for receiving and heterodyning the coarse ambiguity resolution signals from said first and third units to develop a tenth beat signal, second receiving means for receiving and heterodyning the position indicating signals received from the first and second units to develop an eleventh beat signal and for receiving and heterodyning the position indicating signals received from the first and third units to develop a twelfth beat signal, manually operated switch means connected to said first receiving means and effective in a first position to render the first receiving means operative to receive the three medium ambiguity resolution signals and effective in a second position to render said first receiving means operative to receive the three coarse ambiguity resolution signals, means jointly responsive to the eleventh beat signal and the first reference signal to produce a first fine position indication identifying the location of the mobile receiving unit relative to the first and second units, means jointly responsive to the twelfth beat signal and the second reference signal for providing a second fine position indication identifying the location of the mobile receiving unit relative to the first and third units, first coarse indicating means jointly responsive to the first and third reference signals and to the seventh and eleventh beat signals for providing a first medium position indication identifying the location of the mobile receiving unit relative to the first and second units when said switch means is in said first position, second coarse indicating means jointly responsive to the second and fourth reference signals and to the eighth and twelfth beat signals for providing a second medium position indicating signal identifying the position of the mobile receiving unit relative to said first and third units when said switch means is in said first position, said first coarse position indicating means being jointly responsive to the first and fifth reference signals and to the ninth and eleventh beat signals for providing a first coarse position indication identifying the location of the mobile receiving unit relative to the first and second units when said switch means is in said second position, and said second coarse position indicating means being jointly responsive to the second and sixth reference signals and to the tenth and twelfth beat signals for providing a second coarse position indication identifying the location of the mobile receiving unit relative to said first and third units when said switch means is in said second position.

27. Mobile receiving equipment for use in radio location systems of the type wherein at least three spaced apart transmitting units are employed each radiating a position indicating signal, a medium ambiguity resolution signal, a coarse ambiguity resolution signal and including fixed means for receiving and heterodyning the position indicating signals radiated from a first and second of said units to develop a first beat signal, for receiving and heterodyning the position indicating signals radiated from the first and third of said units to develop a second beat signal, for receiving and heterodyning the medium ambiguity resolution signals radiated from said first and second units to develop a third beat signal, for receiving and heterodyning the medium ambiguity resolution signals radiated from the first and third units to develop a fourth beat signal, for receiving and heterodyning the coarse ambiguity resolution signals from said first and second units to develop a fifth beat signal and for receiving and heterodyning the coarse ambiguity resolution signal from the first and third units to develop a sixth beat signal together with means for radiating first, second, third, fourth, fifth and sixth reference signals respectively derived from said first, second, third, fourth, fifth and sixth beat signals, said equipment comprising means for receiving and detecting all six of the reference signals, first receiving means for receiving and heterodyning the medium ambiguity resolution signals from said first and second units to develop a seventh beat signal, for receiving and heterodyning the medium ambiguity resolution signals received from the first and third units to develop an eighth beat signal, receiving and heterodyning the coarse ambiguity resolution signals from the first and second units to develop a ninth beat signal, and for receiving and heterodyning the coarse ambiguity resolution signals from said first and third units to develop a tenth beat signal, second receiving means for receiving and heterodyning the position indicating signals received from the first and second units to develop an eleventh beat signal and for receiving and heterodyning the position indicating signals received from the first and third units to develop a twelfth beat signal, manually operated switch means connected to said first receiving means and effective in a first position to render the first receiving means operative to receive the three medium ambiguity resolution signals and effective in a second position to render said first receiving means operative to receive the three coarse ambiguity resolution signals, means jointly responsive to the eleventh beat signal and the first reference signal to produce a first fine position indication identifying the location of the mobile receiving unit relative to the first and second units, means jointly responsive to the twelfth beat signal and the second reference signal for providing a second fine position indication identifying the location of the mobile receiving unit relative to the first and third units, first coarse indicating means jointly responsive to the first and third reference signals and to the seventh and eleventh beat signals for providing a first medium position indication identifying the location of the mobile receiving unit relative to the first and second units when said switch means is in said first position, second coarse indicating means jointly responsive to the second and fourth reference signals and to the eighth and twelfth beat signals for providing a second medium position indicating signal identifying the position of the mobile receiving unit relative to said first and third units when said switch means is in said first position, said first coarse position indicating means being jointly responsive to the first and fifth reference signals and to the ninth and eleventh beat signals for providing a first coarse position indication identifying the location of the mobile receiving unit relative to the first and second units when said switch means is in said second position and said second coarse position indicating means being jointly responsive to the second and sixth reference signals and to the tenth and twelfth beat signals for providing a second coarse position indication identifying the location of the mobile receiving unit relative to said first and third units when said switch means is in said second position.

28. Mobile receiving equipment for use in radio location systems of the type wherein at least two spaced apart transmitting units are employed each radiating a position indicating signal, a medium ambiguity resolution signal, a coarse ambiguity resolution signal and including fixed means for receiving and heterodyning the position indicating signals radiated from said units to develop a first beat signal, for receiving and heterodyning the medium ambiguity resolution signals radiated from said units to develop a second beat signal, and for receiving and heterodyning the coarse ambiguity resolution signals radiated from said units to develop a third beat signal together with means for radiating first, second and third reference signals respectively derived from said first, second and third beat signals, said equipment comprising means for receiving and detecting all three of the reference signals, first receiving means for receiving and heterodyning the medium ambiguity resolution signals from said units to develop a fourth beat signal and for receiving and heterodyning the coarse ambiguity resolution signals from said units to develop a fifth beat signal, second receiving means for receiving and heterodyning the position indicating signals received from the first and second units to develop a sixth beat signal, manually operated switch means connected to said first receiving means and effective in a first position to render the first receiving means operative to receive the medium ambiguity resolution signals and effective in a second position to render said first receiving means operative to receive the coarse ambiguity resolution signal, means jointly responsive to the sixth beat signal and the first reference signal to produce a fine position indication identifying the location of the mobile receiving unit relative to the first and second units, coarse indicating means jointly responsive to the first and second reference signals and to the fourth and sixth beat signals for providing a first medium position indication identifying the location of the mobile receiving unit relative to the first and second units when said switch means is in said first position, and said first coarse position indicating means being jointly responsive to the first and third reference signals and to the fifth and sixth beat signals for providing a first coarse position indication identifying the location of the mobile receiving unit relative to the first and second units when said switch means is in said second position.

References Cited by the Examiner
UNITED STATES PATENTS

| | | | |
|---|---|---|---|
| 2,890,452 | 6/1959 | Rohrback | 343—105 |
| 3,027,555 | 3/1962 | Hawkins et al. | 343—105 |
| 3,027,556 | 3/1962 | Hunsicker et al. | 343—105 |
| 3,214,759 | 10/1965 | Mahoney | 343—105 |

CHESTER L. JUSTUS, *Primary Examiner.*

H. C. WAMSLEY, *Assistant Examiner.*

UNITED STATES PATENT OFFICE
CERTIFICATE OF CORRECTION

Patent No. 3,303,502                                                                           February 7, 1967

Edward H. Mahoney

It is hereby certified that error appears in the above numbered patent requiring correction and that the said Letters Patent should read as corrected below.

Column 19, line 21, for "swtching" read -- switching --; column 21, line 69, strike out "in", second occurrence; column 22, line 62, after "third" insert -- frequency --; line 66, before "between" insert -- in frequency --; column 23, line 5, after "being" insert -- switched at a different rate from those at the second and third units, a reference transmitting station spaced from all --; lines 7 and 8, strike out "third units, a reference transmitting station spaced from all three of said units and including means for generating and"; line 27, after "result" insert -- of --; line 32, after "ambiguity" insert -- resolution --; line 71, for "sgnals" read -- signals --; line 73, for "receving" read -- receiving --; column 26, line 27, for "fifth" read -- first --; column 27, line 62, strike out "the first unit being switched at a different rate" and insert instead -- said units are effective to cause radiation of the --; column 30, line 65, for "sgnal" read -- signal --; same line 65, for "acoarse" read -- a coarse --; column 31, line 53, after "units" insert a comma; column 36, line 53, after "position" insert a comma.

Signed and sealed this 28th day of November 1967.

(SEAL)
Attest:

EDWARD M. FLETCHER, JR.
Attesting Officer

EDWARD J. BRENNER
                                                                     Commissioner of Patents